US00RE44611E

(19) United States
(12) Reissued Patent
Metcalf

(10) Patent Number: US RE44,611 E
(45) Date of Reissued Patent: Nov. 26, 2013

(54) SYSTEM AND METHOD FOR INTEGRAL TRANSFERENCE OF ACOUSTICAL EVENTS

(75) Inventor: Randall B. Metcalf, Cantonment, FL (US)

(73) Assignee: Verax Technologies Inc., Pensacola, FL (US)

(21) Appl. No.: 12/609,557

(22) Filed: Oct. 30, 2009

Related U.S. Patent Documents

Reissue of:
(64) Patent No.: 7,289,633
Issued: Oct. 30, 2007
Appl. No.: 11/247,239
Filed: Oct. 12, 2005

U.S. Applications:
(63) Continuation of application No. 10/673,232, filed on Sep. 30, 2003, now abandoned.

(60) Provisional application No. 60/414,423, filed on Sep. 30, 2002.

(51) Int. Cl.
*H04R 5/00* (2006.01)

(52) U.S. Cl.
USPC ..... 381/17; 367/8; 359/901

(58) Field of Classification Search
USPC ..... 381/1, 17–19; 700/94; 359/901; 367/8; 369/22, 47, 86–88
See application file for complete search history.

(56) References Cited

U.S. PATENT DOCUMENTS

| | | | | |
|---|---|---|---|---|
| 257,453 | A | 5/1882 | Ader | |
| 572,981 | A | 12/1896 | Goulvin | |
| 1,765,735 | A | 6/1930 | Phinney | |
| 2,352,696 | A | 7/1944 | De Boer et al. | 381/2 |
| 2,819,342 | A | 1/1958 | Becker | 179/1 |
| 3,158,695 | A | 11/1964 | Camras | 369/91 |
| 3,540,545 | A | 11/1970 | Herleman et al. | 181/31 |
| 3,710,034 | A | 1/1973 | Murry | 360/7 |
| 3,944,735 | A | 3/1976 | Willcocks | 179/1 |

(Continued)

FOREIGN PATENT DOCUMENTS

| | | |
|---|---|---|
| EP | 0 593 228 A | 4/1994 |
| EP | 1 416 769 | 5/2004 |

OTHER PUBLICATIONS

A. J. Berkhout et al., Acoustic Control by Wave Field Synthesis, J. Acoust. Soc. Am., vol. 93, No. 5, May 1993, at 2764.*

(Continued)

*Primary Examiner* — Tuan D Nguyen
(74) *Attorney, Agent, or Firm* — Pillsbury Winthrop Shaw Pittman LLP

(57) ABSTRACT

A sound system for capturing and reproducing sounds produced by a plurality of sound sources. The system comprises a device for receiving sounds produced by the plurality of sound sources and converting the separately received sounds to a plurality of separate audio signals without mixing the audio signals. The system may further comprise a device for separately storing the plurality of separate audio signals on a recording medium without mixing the audio signals and a device for reading the stored audio signals from the recording medium. A sound system and method for modeling a sound field generated by a sound source and creating a sound event based on the modeled sound field is also disclosed. The system and method captures a sound field over an enclosing surface, models the sound field and enables reproduction of the modeled sound field.

18 Claims, 21 Drawing Sheets

(56) References Cited

U.S. PATENT DOCUMENTS

| | | | | | |
|---|---|---|---|---|---|
| 4,072,821 | A | | 2/1978 | Bauer | 381/23 |
| 4,096,353 | A | | 6/1978 | Bauer | 381/21 |
| 4,105,865 | A | | 8/1978 | Guillory | 179/1 |
| 4,196,313 | A | | 4/1980 | Griffiths | 179/1 M |
| 4,377,101 | A | | 3/1983 | Santucci | 84/743 |
| 4,393,270 | A | | 7/1983 | Van Den Berg | 381/98 |
| 4,408,095 | A | | 10/1983 | Ariga et al. | 381/24 |
| 4,422,048 | A | | 12/1983 | Edwards | 330/109 |
| 4,433,209 | A | | 2/1984 | Kurosawa et al. | 381/1 |
| 4,481,660 | A | | 11/1984 | De Koning et al. | 381/58 |
| 4,675,906 | A | | 6/1987 | Sessler et al. | 381/92 |
| 4,683,591 | A | | 7/1987 | Dawson et al. | 381/85 |
| 4,782,471 | A | | 11/1988 | Klein | 367/168 |
| 5,027,403 | A | | 6/1991 | Short et al. | 381/306 |
| 5,033,092 | A | | 7/1991 | Sadaie | 381/97 |
| 5,046,101 | A | | 9/1991 | Lovejoy | 381/57 |
| 5,058,170 | A | | 10/1991 | Kanamori et al. | 381/92 |
| 5,142,586 | A | * | 8/1992 | Berkhout | 381/63 |
| 5,150,262 | A | | 9/1992 | Hosokawa et al. | 360/48 |
| 5,212,733 | A | | 5/1993 | DeVitt et al. | 381/119 |
| 5,225,618 | A | | 7/1993 | Wadhams | 84/602 |
| 5,260,920 | A | | 11/1993 | Ide et al. | 369/5 |
| 5,315,060 | A | | 5/1994 | Paroutaud | 84/726 |
| 5,367,506 | A | | 11/1994 | Inanaga et al. | 369/4 |
| 5,400,405 | A | | 3/1995 | Petroff | 381/1 |
| 5,400,433 | A | | 3/1995 | Davis et al. | 704/220 |
| 5,404,406 | A | | 4/1995 | Fuchigami et al. | 381/17 |
| 5,452,360 | A | | 9/1995 | Yamashita et al. | 381/63 |
| 5,465,302 | A | | 11/1995 | Lazzari et al. | 381/92 |
| 5,497,425 | A | | 3/1996 | Rapoport | 381/18 |
| 5,506,907 | A | | 4/1996 | Ueno et al. | 381/18 |
| 5,506,910 | A | | 4/1996 | Miller et al. | 381/103 |
| 5,521,981 | A | | 5/1996 | Gehring | 381/17 |
| 5,524,059 | A | | 6/1996 | Zurcher | 381/92 |
| 5,627,897 | A | | 5/1997 | Gagliardini et al. | 381/71.7 |
| 5,657,393 | A | | 8/1997 | Crow | 381/92 |
| 5,740,260 | A | | 4/1998 | Odom | 381/119 |
| 5,768,393 | A | | 6/1998 | Mukojima et al. | 381/17 |
| 5,781,645 | A | | 7/1998 | Beale | 381/182 |
| 5,790,673 | A | | 8/1998 | Gossman | 381/71.1 |
| 5,796,843 | A | | 8/1998 | Inagawa et al. | 381/17 |
| 5,809,153 | A | | 9/1998 | Aylward et al. | 381/155 |
| 5,812,685 | A | * | 9/1998 | Fujita et al. | 381/332 |
| 5,822,438 | A | | 10/1998 | Sekine et al. | 381/17 |
| 5,850,455 | A | | 12/1998 | Arnold et al. | 381/17 |
| 5,857,026 | A | | 1/1999 | Scheiber | 381/23 |
| 6,021,205 | A | | 2/2000 | Yamada et al. | 381/310 |
| 6,041,127 | A | | 3/2000 | Elko | 381/92 |
| 6,072,878 | A | | 6/2000 | Moorer | 381/18 |
| 6,084,168 | A | | 7/2000 | Sitrick | 84/477 R |
| 6,154,549 | A | | 11/2000 | Arnold et al. | 381/104 |
| 6,219,645 | B1 | | 4/2001 | Byers | 704/275 |
| 6,239,348 | B1 | * | 5/2001 | Metcalf | 84/723 |
| 6,356,644 | B1 | | 3/2002 | Pollak | 381/371 |
| 6,444,892 | B1 | | 9/2002 | Metcalf | 84/723 |
| 6,574,339 | B1 | | 6/2003 | Kim et al. | 381/17 |
| 6,608,903 | B1 | | 8/2003 | Miyazaki et al. | 381/17 |
| 6,664,460 | B1 | | 12/2003 | Pennock et al. | 84/662 |
| 6,686,531 | B1 | | 2/2004 | Pennock et al. | 84/615 |
| 6,738,318 | B1 | | 5/2004 | Harris | 369/2 |
| 6,740,805 | B2 | | 5/2004 | Metcalf | 84/723 |
| 6,826,282 | B1 | | 11/2004 | Pachet et al. | 381/61 |
| 6,829,018 | B2 | | 12/2004 | Lin et al. | 348/738 |
| 6,925,426 | B1 | | 8/2005 | Hartmann | 703/5 |
| 6,959,096 | B2 | * | 10/2005 | Boone et al. | 381/152 |
| 6,990,211 | B2 | | 1/2006 | Parker | 381/74 |
| 7,138,576 | B2 | | 11/2006 | Metcalf | 84/723 |
| 7,206,648 | B2 | | 4/2007 | Fujishita | 700/94 |
| 7,383,297 | B1 | | 6/2008 | Atsmon et al. | 709/200 |
| 7,572,971 | B2 | | 8/2009 | Metcalf | 84/723 |
| 7,636,448 | B2 | | 12/2009 | Metcalf | 381/300 |
| 7,994,412 | B2 | | 8/2011 | Metcalf | 84/723 |
| 2001/0055398 | A1 | | 12/2001 | Pachet et al. | 381/80 |
| 2003/0123673 | A1 | | 7/2003 | Kojima | 381/1 |
| 2004/0111171 | A1 | | 6/2004 | Jang et al. | 700/94 |
| 2004/0131192 | A1 | | 7/2004 | Metcalf | 381/1 |
| 2005/0141728 | A1 | | 6/2005 | Moorer | 381/61 |
| 2005/0195998 | A1 | | 9/2005 | Yamamoto et al. | 381/119 |
| 2006/0109988 | A1 | | 5/2006 | Metcalf | 381/104 |
| 2006/0117261 | A1 | | 6/2006 | Sim et al. | 715/727 |
| 2006/0206221 | A1 | | 9/2006 | Metcalf | 700/94 |

OTHER PUBLICATIONS

J.D. D Maynard et al., Nearfield Acoustic Holography: I. Theory of Generalized Holography and the Development of NAH, J. Acoust. Soc. Am. 78, Oct. 1985, at 1395.*

Amatriain et al., "Transmitting Audio Content as Sound Objects", AFS 22nd International Conference on Virtual, Synthetic and Entertainment Audio, Music Technology, Group, IUA, UPF, Barcelona, Spain, pp. 1-11.

Amundsen, "The Propagator Matrix Related to the Kirchhoff-Helmholtz Integral in Inverse Wavefield Extraplation", *Geophysics,* vol. 59, No. 11, Dec. 1994, pp. 1902-1909.

Avanzini et al., "Controlling Material Properties in Physical Models of Sounding Objects", ICMC'01-1 Revised Version, pp. 1-4.

Boone, "Acoustic Rendering with Wave Field Synthesis", Presented at Acoustic Rendering for Virtual Envirnments, Snowbird, UT, May 26-29, 2001, pp. 1-9.

Budnik, "Discretizing the Wave Equation", In *What is and what will be: Integrating Spirituality and Science.* Retrieved Jul. 3, 2003, from http:..www.mtnmath.com/whatth/node47.html, 12 pages.

Campos, et al., "A Parallel 3D Digital Waveguide Mesh Model with Tetrahedral Topology for Room Acoustic Simulation", Proceedings of the Cost G-6 Conference on Digital Audio Effects (DAFX-00), Verona, Italy, Dec. 7-9, 2000, pp. 1-6.

Caulkins et al., "Wave Field Synthesis Interaction with the Listening Environment, Improvements in the Reproduction of Virtual Sources Situated Inside the Listening Room", Proc. of the 6$^{th}$ Int. Conference on Digital Audio Effects (DAFx-03), London, U.K. Sep. 8-11, 2003, pp. 1-4.

Chopard et al., "Wave Propagation in Urban Microcells: A Massively Parallel Approach Using the TLM Method", Retrieved Jul. 3, 2003, from http://cui.unige.ch/~luthi/links/tlm/tlm/tlm.html, 1 page.

Corey et al., "an integrated Multidimensional Controller of Auditory Perspective in a Multichannel Soundfield", presented at the 111$^{th}$ Convention of the Audio Engineering Society, New York, New York, pp. 1-10.

Davis, "History of Spatial Coding", *Journal of the Audio Engineering Society,* vol. 51, No. 6, Jun. 2003, pp. 554-569.

De Poli et al., "Abstract Musical Timbre and Physical Modeling", Jun. 21, 2002, pp. 1-21.

De Vries et al., "Auralization of Sound Fields by Wave Field Synthesis", Laboratory of Acoustic Imaging and Sound Control, pp. 1-10.

De Vries et al., "Wave Field Synthesis and Analysis Using Array Technology", Proc. 1999 IEEE Workshop on Applications of Signal Processing to Audio and Acoustics, New Paltz, New York, Oct. 17-20, 1999, pp. 15-18.

Farina et al., "Realisation of 'Virtual' Musical Instruments: Measurements of the Impulse Response of Violins Using MLS Technique", 9 pages.

Farina et al., "Subjective Comparisons of 'Virtual' Violins Obtained by Convolution", 6 pages.

Holt, "Surround Sound: The Four Reasons", *The Absolute Sound,* Apr./May 2002, pp. 31-33.

Horbach et al., "Numerical Simulation of Wave Fields Created by Loudspeaker Arrays", Audio Engineering Society 107$^{th}$ Convention, New York, New York, Sep. 1999, pp. 1-16.

Kleiner et al., "Emerging Technology Trends in the Areas of the Technical Committees of the Audio Engineering Society", *Journal of the Audio Engineering Society,* vol. 51, No. 5, May 2003, pp. 442-451.

Landone et al., "Issues in Performance Prediction of Surround Systems in Sound Reinforcement Applications", Proceedings of the 2$^{nd}$ COST G-6 Workshop on Digial Audio Effects (DAFx99), NTNU, Trondheim, Dec. 9-11, 1999, 6 pages.

Lokki et al., "The DIVA Auralization System", Helsinki University of Technology, pp. 1-4.

(56) References Cited

OTHER PUBLICATIONS

"Lycos Asia Malaysia—News", printed on Dec. 3, 2001, from http://livenews.lycosasia.com/my/, 3 pages.
Martin, "Toward Automatic Sound Source Recognition: Identifying Musical Instruments", presented at the NATO Computational Hearing Advanced Study Institute, II Ciocco, Italy, Jul. 1-12, 1998, pp. 1-6.
Melchior et al., "Authoring System for Wave Field Synthesis Content Production", presented at the 115th Convention of the Audio Engineering Society, New York, New York, Oct. 10-13, 2003, pp. 1-10.
Miller-Daly, "What You Need to Know About 3D Graphics/Virtual Reality: Augmented Reality Explained", retrieved Dec. 5, 2003, from http://web3d.about.com/library/weekly/aa012303a.htm, 3 pages.
Muller-Tomfelde, "Hybrid Sound Reproduction in Audio-Augmented Reality", AES 22nd International Conference on Virtual, Synthetic and Entertainment Audio, pp. 1-6.
Neuman et al., "Augmented Virtual Environments (AVE) for Visualization of Dynamic Imagery", Integrated Media Systems Center, Los Angeles, California, 5 pages.
"New Media for Music: An Adaptive Response to Technology", *Journal of the Audio Engineering Society,* vol. 51, No. 6, Jun. 2003, pp. 575-577.
Nicol et al., "Reproducing 3D-Sound for Videoconferencing: a Comparison Between Holophony and Ambisonic", France Telecom CNET Lannion, 4 pages.
Riegelsberger et al. Advancing 3D Audio Through an Acoustic Geometry Interface, 6 pages.
"Brains of Deaf People Rewire to 'Hear' Music", *Science/Daily Magazine,* University of Washington, Nov. 28, 2001, 2 pages.
Smith, "Deaf Peole Can 'Feel' Music: Might Explain How Some Are Able to Become Peformers", retrieved Dec. 3, 2001, from http://my.webmd.com/printing/article/1830.50576, 1 page.
Sontacchi et al., "Enhanced 3D Sound Field Synthesis and Reproduction System by Compensating Interfering Reflections", Proceedings of the COST G-6 Conference on Digital Audio Effects (DAFX-00), Verona, Italy, Dec. 7-9, 2000, pp. 1-6.
Spors et al., "High-Quality Acoustic Rendering with Wave Field Synthesis", University of Erlangen-Nuremberg, Erlangen, Germany, Nov. 20-22, 2002, 8 pages.
Theile, "Spatial Perception in WFS Rendered Sound Fields", 2 pages.
Theile et al., "Potential Wavefield Synthesis Applications in the Multichannel Stereophonic World", AES 24th International Conference on Multichannel Audio, pp. 1-15.
Tool, "Direction and Space, the Final Frontiers: How Many Channels do We Need to be Able to Believe that We are 'There'?", Harman International Industries, Northridge, California, pp. 1-30.
Toole, "Adio-Science in the Service of Art," Harman Itnernational Industries, Northridge, California, pp. 1-23.
Tsingos et al., "Validation of Acoustical Simulation in the 'Bell Labs Box'", Bell Laboratories-Lucent Technologies, 7 pages.
University of York Music Technology Research Group, "Surrounded by Sound—A Sonic Revolution", retrieved Feb. 10, 2004, from http://www-users.york.ac.uk/~dtm3/RS/RSweb.htm, 7 pages.
Vaananen, "User Interaction and Authoring of 3D Sound Scenes in the Carrouso EU Project", Audio Engineering Society Convention Paper 5764, Presented at the 114th Convention, Mar. 22-25, 2003, pp. 1-9.
Vaananen et al. "Encoding and Rendering of Perceptual Sound Scenes in the Carrouso Project", AES 22nd International Conference on Virtual, Synthetic and Entertainment Audio, pp. 1-9.
"Virtual and Synthetic Audio: The Wonderful World of Sound Objects", *Journal of Audio Engineering Society,* vol. 51, No. 1/2, Jan./Feb. 2003, pp. 93-98.
Wittek, "Optimised Phantom Source Imaging of the High Frequency Content of Virtual Sources in Wave Field Synthesis", A Hybrid WFS/Phantom Source Solution to Avoid Spatial Aliasing, Munich, Germany: Institut fur Rundfunktechnik, 2002, pp. 1-10.
Wittek, "Perception of Spatially Synthesized Sound Fields", University of Surrey—Institute of Sound Recording, Guildford, Surrey, UK, Dec. 2003, pp. 1-43.
Young, "Networked Music: Bridging Real and Virtual Space", Peabody Conservatory of Music, Johns Hopkins University, Baltimore, Maryland, 4 pages.
"Discretizing of the Huygens Principle", retrieved Jul. 3, 2003, from http://cui.unige.ch/~luthi/links/tlm/node3.html, 2 pages.
"The Dispersion Relation", retrieved May 14, 2004, from http://cui.unige.ch/~luthi/links/tlm/node4.html, 3 pages.

* cited by examiner

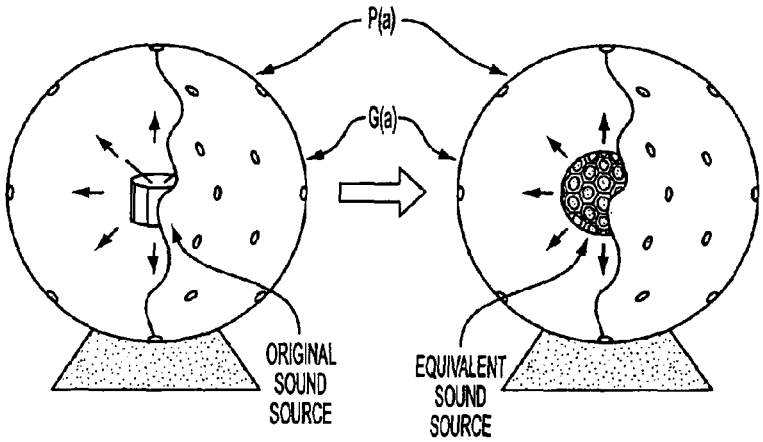

FIG. 12A

| EXT EVENT | EXT CAPTURE | EXT SYNTHESIS | EXT REPRODUCTION |
|---|---|---|---|
| ORIGINAL SOUND EVENT<br>CONTINUOUS<br>INTEGRAL WAVE | DISCRETE NODAL CAPTURE<br>SEGMENTED<br>DISTRIBUTIVE WAVE | INVERSE DISTRIBUTIVE WAVE COMPUTATIONS | DISTRIBUTIVE WAVE PRODUCTION<br>INTEGRAL WAVE REPRODUCTION |
| ANALOG DOMAIN | ANALOG CAPTURE<br>ANALOG → DIGITAL CONVERSION | DIGITAL DOMAIN | DIGITAL → ANALOG CONVERSION |

FIG. 12B

| CONVERGENT WAVE FIELD SYNTHESIS (CWFS) | DIVERGENT WAVE FIELD SYNTHESIS (DWFS) |
|---|---|
| 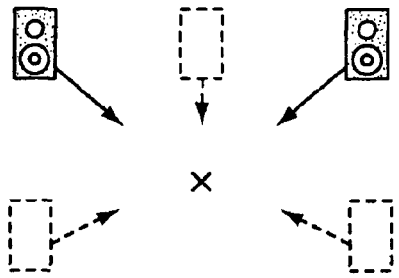 — = STEREO<br>= SURROUND SOUND<br>× = LISTENER'S POSITION | 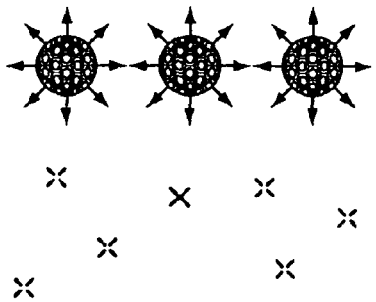 × = PRIMARY LISTENING POSITION<br>× = ALTERNATE LISTENING POSITIONS |
| RECEIVER ORIENTED (WAVE FIELD CONVERGES ON RECEIVER) | SOURCE ORIENTED (WAVE FIELD DIVERGES FROM SOURCES) |
| STATIONARY PERSPECTIVE (SWEET SPOT) | MOVABLE PERSPECTIVE (NO SWEET SPOT) |
| STEREO OR SURROUND (PER EVENT) | MONO (PER DISCRETE SOURCE) |
| DISCRETE MULTICHANNELS USED FOR DIRECTIONAL CUES (L,R,C,RL,RR,ETC) | DISCRETE MULTICHANNELS USED FOR SOURCE SEGREGATION AND CUSTOMIZATION |
| COMPOSITE RENDERING (DISCRETE SOURCES ARE MIXED TOGETHER EARLY IN THE RECORDING & REPRODUCTION CHAIN) | DISCRETE RENDERING (DISCRETE SOURCES REMAIN DISCRETE ALL THE WAY THROUGH THE RECORDING & REPRODUCTION CHAIN) |
| INTEGRAL WAVE FORM OF DISCRETE SOURCES ARE LOST DUE TO THE MXING OF SIGNALS AND PARADIGMATIC DISTORTIONS | INTEGRAL WAVE FORM OF DISCRETE SOURCES CAN BE REPRODUCED BECAUSE THERE ARE NO PARADIGMATIC DISTORTIONS AND THE SOURCE SIGNALS REMAIN SEGREGATED |

FIG. 21

SYSTEM AND METHOD FOR INTEGRAL TRANSFERENCE OF ACOUSTICAL EVENTS

Matter enclosed in heavy brackets [ ] appears in the original patent but forms no part of this reissue specification; matter printed in italics indicates the additions made by reissue.

RELATED APPLICATIONS

This application is a continuation of U.S. patent application Ser. No. 10/673,232 filed Sep. 30, 2003 now abandoned which claims priority to provisional application No. 60/414,423 filed Sep. 30, 2002, the subject matter of which is incorporated by reference herein in its entirety. This application is related to U.S. patent application Ser. No. 08/749,766, filed Nov. 20, 1996, and U.S. patent application Ser. No. 09/393,324, filed Oct. 9, 1999, the subject matter of which is incorporated by reference herein in its entirety.

FIELD OF THE INVENTION

The invention generally relates to methods and apparatus for recording and reproducing a sound event by separately capturing each object within a sound event, transferring the separately captured objects for storage and/or reproduction, and reproducing the original sound event by discretely reproducing each of the separately captured objects and selectively controlling the interaction between the objects based on relationships therebetween.

BACKGROUND OF THE INVENTION

Methods and systems for recording and reproducing sounds produced by a plurality of sound sources are generally known. In the musical context, for example, systems for recording and reproducing live performances of bands and orchestras are known. In those cases, the sound sources include the musical instruments and performers' voices.

Recording and reproducing sound produced by a sound source typically involves detecting the physical sound waves produced by the sound source, converting the sound waves to audio signals (digital or analog), storing the audio signals on a recording medium and subsequently reading and amplifying the stored audio signals and supplying them as an input to one or more loudspeakers to reconvert the audio signals back to physical sound waves.

Audio signals are typically electrical signals that correspond to actual sound waves, however this correspondence is "representative", not "congruent", due to various limitations intrinsic to the process of capturing and converting acoustical data. Other forms of audio signals (e.g., optical), although more reliable in the transmission of acoustical data, encounter similar limitations due to capturing and converting the acoustical data from the original sound field.

The quality of the sound produced by a loudspeaker partly depends on the quality of the audio signal input to the loudspeaker, and partly depends on the ability of the loudspeaker to respond to the signal accurately. Ideally, to enable precise reproduction of sound, the audio signals should correspond exactly to (i.e., be a perfect representation of) the original sound, including its spatial (3D) properties, and the reconversion of the audio signals back to sound should be a perfect conversion of the audio signal to sound waves including its spatial (3D) properties. In practice however, such perfection has not been achieved due to various phenomenon that occur in the various stages of the recording/reproducing process, as well as deficiencies that exist in the design concept of "universal" loudspeakers.

Additional problems are presented when trying to precisely record and reproduce sound produced by a plurality of sound sources. One significant problem encountered when trying to reproduce sounds from a plurality of sound sources is the inability of the system to recreate what is referred to as sound staging. Sound staging is the phenomena that enables a listener to perceive the apparent physical size and location of a musical presentation. The sound stage includes the physical properties of depth and width. These properties contribute to the ability to listen to an orchestra, for example, and be able to discern the relative position of different sound sources (e.g., instruments). However, many recording systems fail to precisely capture the sound staging effect when recording a plurality of sound sources. One reason for this is the methodology used by many systems. For example, such systems typically use one or more microphones to receive sound waves produced by a plurality of sound sources (e.g., drums, guitar, vocals, etc.) and convert the sound waves to electrical audio signals. When one microphone is used, the sound waves from each of the sound sources are typically mixed (i.e., superimposed on one another) to form a composite signal. When a plurality of microphones are used, the plurality of audio signals are typically mixed (i.e., superimposed on one another) to form a composite signal. In either case the composite signal is then stored on a storage medium. The composite signal can be subsequently read from the storage medium and reproduced in an attempt to recreate the original sounds produced by the sound sources. However, the mixing of signals, among other things, limits the ability to recreate the sound staging of the plurality of sound sources. Thus, when signals are mixed, the reproduced sound fails to precisely recreate the field definition and source restitution of the original sounds. This is one reason why an orchestra sounds different when listened to live as compared with a recording. This is one major drawback of prior sound systems. Other problems are caused by mixing as well.

While attempts have been made to address these drawbacks, none has adequately overcome the problem. For example, in some cases, the composite signal includes two separate channels (e.g., left and right) in an attempt to spatially separate the composite signal. In some cases, a third (e.g., center) or more channels (e.g., front and back) are used to achieve greater spatial separation of the original sounds produced by the plurality of sound sources. Two popular methodologies used to achieve a degree of spatial separation, especially in home theater audio Systems, are Dolby Surround and Dolby Pro Logic. Dolby Pro Logic is the more sophisticated of the two and combines four audio channels into two for storage and then separates those two channels into four for playback over five loudspeakers. Specifically, a Dolby Pro Logic system starts with left, center and right channels across the front of the viewing area and a single surround channel at the rear. These four channels are stored as two channels, reconverted to four and played back over left, center and right front loudspeakers and a pair of monaural rear surround loudspeakers that are fed from a single audio channel. While this technique provides some measure of spatial separation, it fails to precisely recreate the sound staging and suffers from other problems, including those identified above.

Other techniques for creating spatial separation have been tried using a plurality of channels. However, regardless of the number of channels, such systems typically involve mixing source signals to form one or more composite signals. Even systems touted as "discrete multi-channel", typically base the discreteness of each channel on a "directional component" (i.e., Dolby's AC-3, discrete 5.1 multi-channel surround sound is based on five discrete directional channels and one low-frequency effect channel). Surround sound using discrete channels for directional cues help create a more engulfing acoustical effect, but do not address the critical losses of veracity within the representative audio signal nor does it address the reproduction of the intraspace dynamics created by individual sound sources interacting with one another in a defined space.

Other separation techniques are commonly used in an attempt to enhance the recreation of sound. For example, each loudspeaker typically includes a plurality of loudspeaker components, with each component dedicated to a particular frequency band to achieve a frequency distribution of the reproduced sounds. Commonly, such loudspeaker components include woofer or bass (lower frequencies), mid-range (moderate frequencies) and tweeters (higher frequencies). Components directed to other specific frequency bands are also known and may be used. When frequency distributed components are used for each of multiple channels (e.g., left and right), the output signal can exhibit a degree of both spatial distribution and frequency distribution in an attempt to reproduce the sounds produced by the plurality of sound sources. However, maximum recreation of the original sounds is not fully achieved because the source signals continue to be a composite signal as a result of the "mixing" process.

Another problem resulting from the mixing of either sounds produced by sound sources or the corresponding audio signals is that this mixing typically requires that these composite sounds or composite audio signals be played back over the same loudspeaker(s). It is well known that effects such as masking preclude the precise recreation of the original sounds. For example, masking can render one sound inaudible when accompanied by a louder sound. For example, the inability to hear a conversation in the presence of loud amplified music is an example of masking. Masking is particularly problematic when the masking sound has a similar frequency to the masked sound. Other types of masking include loudspeaker masking, which occurs when a loudspeaker cone is driven by a composite signal as opposed to an audio signal corresponding to a single sound source. Thus, in the later case, the loudspeaker cone directs all of its energy to reproducing one isolated sound, as opposed to, in the former, the loudspeaker cone must "time-share" its energy to reproduce a composite of sounds simultaneously.

Another problem with mixing sounds or audio signals and then amplifying the composite signal is intermodulation distortion. Intermodulation distortion refers to the fact that when a signal of two (or more) frequencies is input to an amplifier, the amplifier will output the two frequencies plus the sum and difference of these frequencies. Thus, if an amplifier input is a signal with a 400 Hz component and a 20 KHz component, the output will be 400 Hz and 20 KHz plus 19.6 KHz (20 KHz−400 Hz) and 20.4 KHz (20 KHz+400 Hz).

The mixing of signals can also dictate the use of "universal loudspeakers", meaning that a given loudspeaker must be capable of reproducing a full or broad spectrum of possible sounds. With the exception of frequency range breakout (e.g., electronic crossovers), loudspeakers are typically capable of reproducing a full range of sound sources. Subwoofers and tweeters are exceptions to this rule but their mandate for separation is based on frequency, not "sound source type". The drawbacks with "universal" and "frequency dependent" loudspeakers is that they are not capable of being configured to achieve a full integral sound wave (including full directivity patterns) for a given sound source. By being "universal" and "non-configurable", they can not be optimized for the reproduction of a specific sound source.

More specifically, existing sound recording systems typically use two or three microphones to capture sound events produced by a sound source, e.g., a musical instrument. The captured sounds can be stored and subsequently played back. However, various drawbacks exist with these types of systems. These drawbacks include the inability to capture accurately three dimensional information concerning the sound and spatial variations within the sound (including full spectrum "directivity patterns"). This leads to an inability to accurately produce or reproduce sound based on the original sound event.

A directivity pattern is the resultant sound field radiated by a sound source (or distribution of sound sources) as a function of frequency and observation position around the source (or source distribution). The possible variations in pressure amplitude and phase as the observation position is changed are due to the fact that different field values can result from the superposition of the contributions from all elementary sound sources at the field points. This is correspondingly due to the relative propagation distances to the observation location from each elementary source location, the wavelengths or frequencies of oscillation, and the relative amplitudes and phases of these elementary sources.

It is the principle of superposition that gives rise to the radiation patterns characteristics of various vibrating bodies or source distributions. Since existing recording systems do not capture this 3-D information, this leads to an inability to accurately model, produce or reproduce 3-D sound radiation based on the original sound event.

On the playback side, prior systems typically use "Implosion Type" (IMT) sound fields. That is, they use two or more directional channels to create a "perimeter effect" sound field. The basic IMT method is "stereo," where a left and a right channel are used to attempt to create a spatial separation of sounds. More advanced IMT methods include surround sound technologies, some providing as many as five directional channels (left, center right, rear left, rear right), which creates a more engulfing sound field than stereo. However, both are considered perimeter systems and fail to fully recreate original sounds. Perimeter systems typically depend on the listener being in a stationary position for maximum effect. Implosion techniques are not well suited for reproducing sounds that are essentially a point source, such as stationary sound sources or sound sources in the nearfield (e.g., musical instruments, human voice, animal voice, etc.) that should retain their full spectrum directivity patterns and radiate sound in all or many directions.

Despite significant improvements over the last two decades in signal processing and equipment design, the goal of "perfect sound reproduction" remains elusive.

Another problem with the existing systems of sound reproduction are the paradigmatic and other distortions created in an original event right from the beginning of the recording and reproduction process. Such distortions include: (1) lack of true field definition (source signals are mixed together and rely on perceptual effects for definition); (2) lack of source resolution (source rendering is via plane wave transducers, not integral wave transducers); (3) lack of spatial congruency (when source signals are mixed together, sound staging is an approximation at best, once again relying heavily on perceptual effects). These distortions are passed down through the recording and reproduction chain, so that each phase of the chain creates its own colorations on the original distortions created by the paradigm itself.

For example, in a typical stereo reproduction system, when an original event is captured, a multi-dimensional sound wave is represented by a two-dimensional (left/right) signal which is then mixed together with other two-dimensional signals representing other original sound sources within the same sound event, creating a mixture of two-dimensional signals. Once "spatial" and "mixing" distortions have been captured and processed they are passed along to the storage, recall, and reproduction parts of the recording and reproduction chain where additional colorations may be added, compounding the nature of the paradigmatic distortions.

Other contextual issues such as paradigms within paradigms (or sub-paradigms), often are a result of protocol and/or design issues. An example of a sub-paradigm issue is than of "perceptual" effects versus "physical" effects. Perceptual methods of sound reproduction are designed to trick the ear into perceiving certain elements such as spatial qualities and sound stage. Physical objectives for reproduction are focused on physically reproducing source dynamics including primary sources (sound producing entities) and secondary sources (sound effecting entities like room acoustics).

Yet another problem in sound reproduction is amplification. The current amplification of sound concept has remained essentially unchanged for over 40 years, in that, the output signal equals the input signal but at an elevated level. The problem with this approach is that the input signal may be a distorted representation of the original event and most of the time is a compilation of mixed signals representing the original event. When these signals are amplified, the distortions that are present due to the paradigm are amplified and as a result become more noticeable and have a greater impact on the reproduced event.

Another aspect of the problem relates to the issue of "film" paradigm versus the "music" paradigm. The film paradigm utilizes surround sound very well because, with the exception of dialog, most of the soundtrack is a far-field, moving, dynamic type of sound field (e.g., traffic, outdoor environments, etc.) or ambiance-related sound field (e.g., indoor venue, etc.) both of which do well with surround sound formats. Music, on the other hand, is typically a stationary sound event, usually in the near-field, and usually with a more intimate divergent type wave front as opposed to a convergent type wave front created from mid-field and far-field reproductions used in the film industry. Sub-paradigm issues such as these must be harmonized in accordance with the goals of the broader reproduction paradigm if the paradigmatic context is to be optimized and the paradigmatic distortion minimized or eliminated.

Another issue in the present state of sound recording and reproduction is the objectivism vs. subjectivism issue on how close the reproduced event matches the original sound event. Within the current state-of-the-art paradigm, objective measurements can be made (e.g., input signal vs. output signal), but the comprehensive evaluation of a given sound event remains somewhat subjective primarily because of a flawed context—comparison is between an integral form (original event) and a facsimile form (reproduced event). Only when the reproduction system can generate a synthetic sound event in the same integral form as an original event can we expect to render an objective evaluation of the reproduced event. Subjectivity will always play a role in determining which variations, deviations, etc. to an original event are preferable from one person to the next, but the quantifiable evaluation of a reality event and its corresponding synthetic event, should ultimately be an objective analysis.

The problem with trying to use a term like "realism" as a reference standard is not that it is inherently subjective ("reality" is actually inherently objective—it can be objectively measured and modeled, e.g., acoustical holography), but rather that it cannot be adequately synthesized in the same integral form as the original event. The subjective element arises when the audio community attempts to compare various distorted synthetic realities (reproduced events) to their corresponding undistorted original realities (original events), or worse yet, to one another. Even if perfection is interpreted differently by different people, that should not change the fact that the comparison of a reproduced event A to its corresponding original event A, should be an objective analysis. Even if an original source is unnatural or a hybrid of a natural sound, the objective is still to reproduce the source's integral state as determined by an artist and/or producer. A drawback of current systems is the lack of a means for developing reference standards for the articulation of all definable sound sources, and a means for describing derivatives, hybrids, and any other type of deviation from a given reference sound.

Thus, despite significant research and development, prior systems suffer various drawbacks and fail to maximize the ability of the system to precisely reproduce the original sounds.

SUMMARY OF THE INVENTION

The invention addresses these and other issues with known sound recording and reproduction systems and presents new methods and systems for more realistically reproducing an original sound event.

One embodiment of the invention relates to a system and method for capturing and reproducing sounds from a plurality of sound sources to more closely recreate actual sounds produced by the sound sources, where sounds from each of a plurality of sound sources (or a predetermined group of sources) are captured by separate sound detectors, and where the separately captured sounds are converted to audio signals, recorded, and played back by separately retrieving the stored audio signals from the recording medium and transmitting the retrieved audio signals separately to a separate loudspeaker system for reproduction of the originally captured sounds.

Another embodiment of the invention relates to a system and method for reproducing sounds produced by a plurality of sound sources, where sounds from each sound source (or a predetermined group of sources) are captured by separate sound detectors, and where the separately captured sounds are converted to audio signals, each of which is transmitted separately to a separate loudspeaker system for reproduction of the originally captured sounds.

According to another embodiment of the invention, each loudspeaker system comprises a plurality of loudspeakers or a plurality of groups of loudspeakers (e.g., loudspeaker clusters) customized for reproduction of specific types of sound sources or group(s) of sound sources. Preferably, the customization is based at least in part on characteristics of the sounds to be reproduced by the loudspeaker or based on the dynamic behavior of the sounds or groups of sounds.

According to another embodiment of the invention, each signal path is connected to a separate amplification systems to separately amplify audio signals corresponding to the sounds from each source (or predetermined group of sources). The amplifier systems may be customized for the particular characteristics of the audio signals that it will be amplifying.

According to another embodiment of the invention the amplifier systems are separately controlled by a controller so that the relationship among the components of the power (amplifier) network and those of the loudspeaker network can be selectively controlled. This control can be automatically implemented based on the dynamic characteristics of the audio signals (or the produced sounds) or a user can manually control the reproduction of each sound (or predetermined groups of sounds). For example, the amplifier and loudspeaker systems for each signal path may be automatically controlled by a dynamic controller that controls the relationship among the amplifier systems, the components of the amplifier systems, the loudspeaker systems and the components of the of the loudspeaker systems. For example, the controller can individually turn on/off individual amplifiers of an amplifier system so that increased/decreased power levels can be achieved by using more or less amplifiers for each audio signal instead of stretching the range of a single amplifier. Similarly, the controller can control individual loudspeakers within a loudspeaker system.

If done manually, this may be done through a user interface that enables the user to independently adjust the input power levels of each sound (or predetermined group of sounds) from "off" to relatively high levels of corresponding output power levels without necessarily affecting the power level of any of the other independently controlled audio signals.

If desired, the audio signals output from the sound detectors may be recorded on a recording medium for subsequent readout prior to being transmitted to the loudspeaker systems for reproduction. If recorded, preferably the recording mechanism separately records each of the audio signals on the recording medium without mixing the audio signals. Subsequently, the stored audio signals are separately retrieved and are provided over separate signal paths to individual amplifier systems and then to the separate loudspeaker systems. Preferably, the audio signals are separately controllable, either automatically or manually. The loudspeaker systems preferably are each made up of one or more loudspeakers or loudspeaker clusters and are customized for reproduction of specific types of sounds produced by the respective sound source or group of sound sources associated with the signal path. For example, a loudspeaker system may be customized for the reproduction of violins or stringed instruments. The customization may take into account various characteristics of the sounds to be reproduced, including, frequency, directivity, etc. Additionally, the loudspeakers for each signal path may be configured in a loudspeaker cluster that uses an explosion technique, i.e., sound radiating from a source outwards in various directions (as naturally produced sound does) rather than using an implosion technique, i.e., sound projecting inwardly toward a listener (e.g., from a perimeter of speakers as with surround sound or from a left/right direction as with stereo). In other circumstance, an implosion technique or a combination of explosion/implosion may be preferred.

One embodiment of the invention relates to a system and method for capturing a sound field, which is produced by a sound source over an enclosing surface (e.g., approximately a 360° spherical surface), and modeling the sound field based on predetermined parameters (e.g., the pressure and directivity of the sound field over the enclosing space over time), and storing the modeled sound field to enable the subsequent creation of a sound event that is substantially the same as, or a purposefully modified version of, the modeled sound field.

Another aspect of the invention relates to a system and method for modeling the sound from a sound source by detecting its sound field over an enclosing surface as the sound radiates outwardly from the sound source, and to create a sound event based on the modeled sound field, where the created sound event is produced using an array of loud speakers configured to produce an "explosion" type acoustical radiation. Preferably, loudspeaker clusters are in a 360° (or some portion thereof) cluster of adjacent loudspeaker panels, each panel comprising one or more loudspeakers facing outward from a common point of the cluster. Preferably, the cluster is configured in accordance with the transducer configuration used during the capture process and/or the shape of the sound source.

According to one aspect of the invention, acoustical data from a sound source is captured by a 360° (or some portion thereof) array of transducers to capture and model the sound field produced by the sound source. If a given sound field is comprised of a plurality of sound sources, it is preferable that each individual sound source be captured and modeled separately.

Preferably, a playback system comprising an array of loudspeakers or loudspeaker systems recreates the original sound field. According to one aspect of the invention, an explosion type acoustical radiation is used to create a sound event that is more similar to naturally produced sounds as compared with "implosion" type acoustical radiation. Preferably, the loudspeakers are configured to project sound outwardly from a spherical (or other shaped) cluster. Preferably, the sound field from each individual sound source is played back by an independent loudspeaker cluster radiating sound in 360° (or some portion thereof). Each of the plurality of loudspeaker clusters, representing one of the plurality of original sound sources, can be played back simultaneously according to the specifications of the original sound fields produced by the original sound sources. Using this method, a composite sound field becomes the sum of the individual sound sources within the sound field.

To create a near perfect representation of the sound field, each of the plurality of loudspeaker clusters representing each of the plurality of original sound sources should be located in accordance with the relative location of the plurality of original sound sources. Although this is a preferred method for EXT reproduction, other approaches may be used: For example, a composite sound field with a plurality of sound sources can be captured by a single capture apparatus (360° spherical array of transducers or other geometric configuration encompassing the entire composite sound field) and played back via a single EXT loudspeaker cluster (360° or any desired variation).

These and other aspects of the invention are accomplished according to one embodiment of the invention by defining an enclosing surface (spherical or other geometric configuration) around one or more sound sources, generating a sound field from the sound source, capturing predetermined parameters of the generated sound field by using an array of transducers spaced at predetermined locations over the enclosing surface, modeling the sound field based on the captured parameters and the known location of the transducers and storing the modeled sound field. Subsequently, the stored sound field can be used selectively to create sound events based on the modeled sound field. According to one embodiment, the created sound event can be substantially the same as the modeled sound event. According to another embodiment, one or more parameters of the modeled sound event may be selectively modified. Preferably, the created sound event is generated by using an explosion type loudspeaker configuration. Each of the loudspeakers may be independently driven to reproduce the overall sound field on the enclosing surface.

Another aspect of the invention relates to a system and method for reproducing a sound event includes means for retrieving a plurality of separately stored audio signals for a sound event, where at least one of the audio signals comprises an ambiance sound field of an environment of the sound event and where at least one of the audio signals comprises a sound field for a sound source, amplification means for separately amplifying each audio signal and a loudspeaker network comprising a plurality of loudspeaker means. At least one loudspeaker means comprises a convergent speaker system for reproducing the ambiance sound field and where at least one loudspeaker means comprises a divergent speaker system for reproducing the sound field for the sound source.

In another aspect of the invention, a system and method for creating a holographic or three-dimensional sound event includes storing first data for an integral reality model of a sound source, the data including a plurality of predetermined parameters for creating a holographic or three-dimensional sound for the sound source, inputting second data for a sound event, where the sound event comprises a sound source and where the second data comprises information on a portion of a sound field for the sound source and rendering holographic or three-dimensional sound data for the sound event by extrapolating the second data using the plurality of parameters from the first data, where the holographic or three-dimensional sound data includes information for outputting audio signals to a plurality of loudspeakers positioned in a predetermined three-dimensional arrangement.

Another aspect of the invention relates to a method for objectively comparing a reproduced sound event to an original sound event includes retrieving data representing a modeled sound field of a first radiating sound field of an original sound event, the modeled sound field including a first set of predetermined parameters, converting the data to a plurality of separate audio signals representing the first radiating sound field, separately amplifying each audio signal, communicating each amplified audio signal to a respective loudspeaker of a cluster of loudspeakers, where each respective loudspeaker is arranged along a predetermined geometric position to create a reproduced sound event comprising a second radiating sound field emanating from the cluster of loudspeakers and recording the second radiating sound field via a plurality of transducers arranged on a predetermined geometric surface at least partially surrounding the cluster of loudspeakers. The second radiating sound field includes a second set of predetermined parameters. The method also further includes comparing the second set of predetermined parameters to the first set of predetermined parameters, where a difference between the second set of predetermined parameters and the first set of predetermined parameters establishes an objective determination on a similarity between the reproduced sound event to the original sound event.

Other aspects of the invention include computer instruction and computer readable medium including computer instructions for performing methods according to the above aspects of the invention.

Other embodiments, features and objects of the invention will be readily apparent in view of the detailed description of the invention presented below and the drawings attached hereto. It is also to be understood that both the foregoing general description and the following detailed description are exemplary and not restrictive of the scope of the invention.

BRIEF DESCRIPTION OF THE DRAWINGS

FIG. 12A illustrates an illustrative overview of the surrounding surface of an original and reproduced sound event according to an embodiment of the invention.

FIG. 12B illustrates a chart showing an overview of the process of capturing, synthesizing and reproducing an original sound event according to an embodiment of the invention.

FIG. 21 illustrates an overview Convergent Wave Field Synthesis (CWFS) and Divergent Wave Field Synthesis (DWFS).

DETAILED DESCRIPTION OF THE PREFERRED EMBODIMENTS

Figure 1:
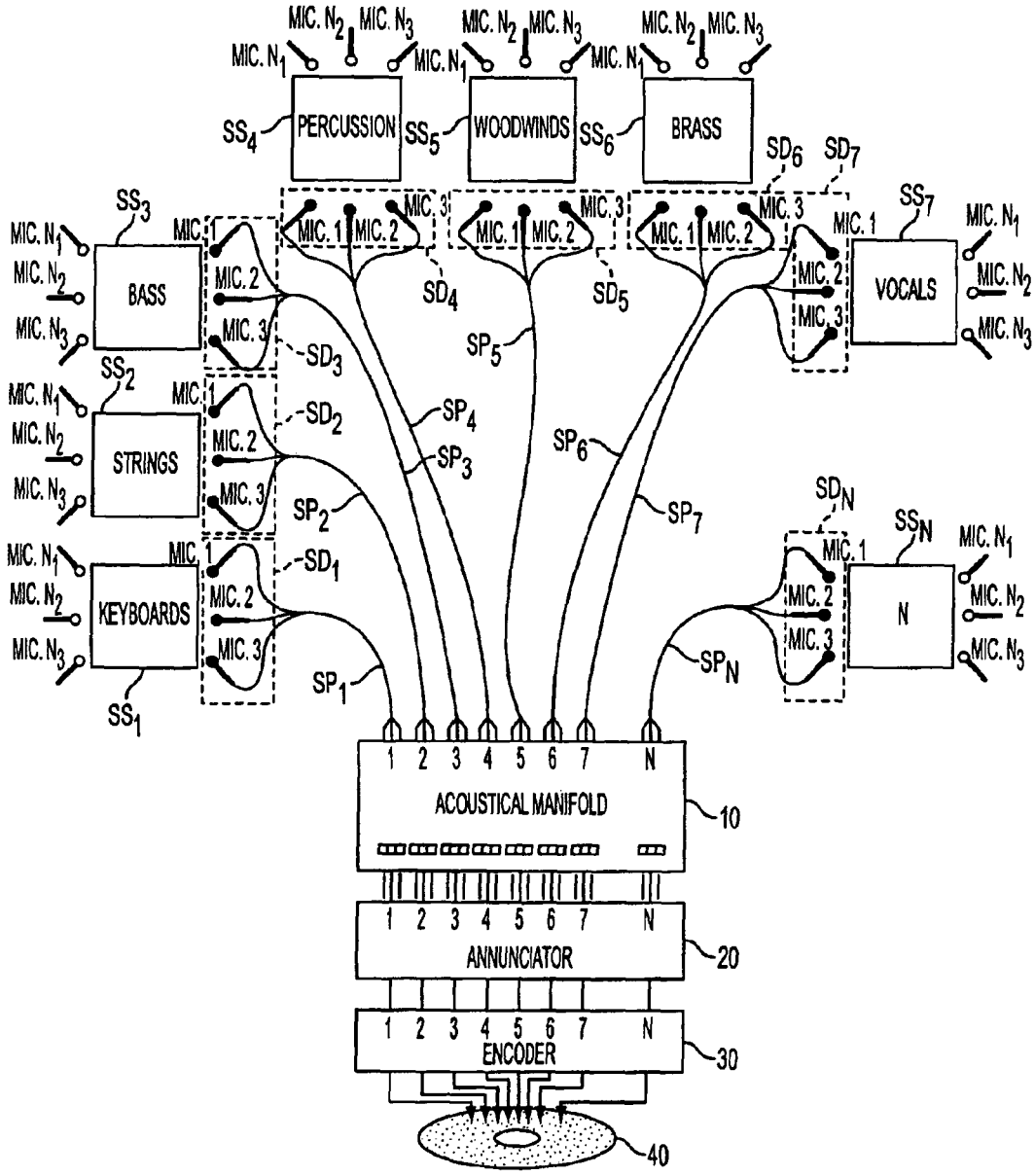
FIG. 1 is a schematic illustration of a sound capture and recording system according to one embodiment of the invention.
Figure 2:
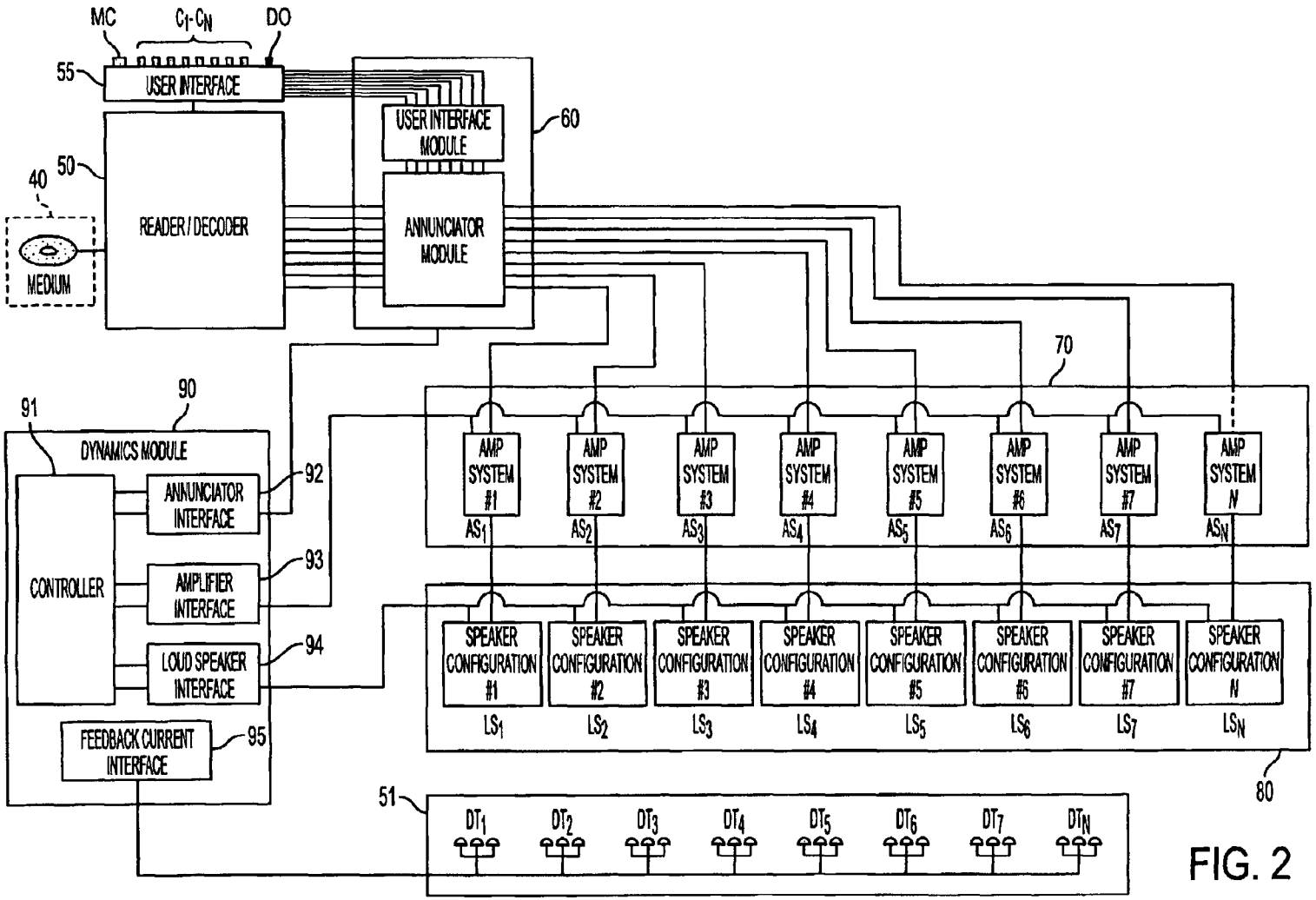
FIG. 2 is a schematic illustration of a sound reproduction system according to one embodiment of the invention.

FIG. 1 is a schematic illustration of a sound capture and recording system according to one embodiment of the invention. As shown in FIG. 1, the system comprises a plurality of sound sources ($SS_1$-$SS_N$) for producing a plurality of sounds, a plurality of sound detectors ($SD_1$-$SD_N$), such as microphones, for capturing or detecting the sounds produced by the N sound sources and for separately converting the N sounds to N separate audio signals. As shown in FIG. 1, the N separate audio signals may be conveyed over separate signal paths ($SP_1$-SPN) to be recorded on a recording medium 40. Alternatively, the N separate audio signals may be transmitted to a sound reproduction system (such as shown in FIG. 2), which preferably includes N loudspeaker systems for converting the audio signals to sound. If the audio signals are to be recorded, the recording medium 40 may be, e.g., an optical disk on which digital signals are recorded. Other storage media (e.g., tapes) and formats (e.g., analog) may be used. In the event that digital recording is used, the N audio signals are separately provided over N signal paths to an encoder 30. Any suitable encoder can be used. The outputs of the encoder 30 are applied to the recording medium 40, where the signals are separately recorded on the recording medium 40. Multiplexing techniques (e.g., time division multiplexing) may also be used. If no recording is performed, the output of the acoustical manifold 10 or the sound detectors ($SD_1$-$SD_N$) may be supplied directly to the amplifier network 70 or acoustical manifold 60 (FIG. 2).

If desired, the N audio signals output from the N sound detectors ($SD_1$-$SD_N$) may be input to an acoustical manifold 10 and/or an annunciator 20 prior to being input to encoder 30. The acoustical manifold 10 is an input/output device that receives audio signal inputs, indexes them (e.g., by assigning an identifier to each data stream) and determines which of the inputs to the manifold have a data stream (e.g.., audio signals) present. The manifold then serves as a switching mechanism for distributing the data streams to a particular signal path as desired (detailed below). The annunciator 20 can be used to enable flexibility in handling different numbers of audio signals and signal paths. Annunciators are active interface modules for transferring or combining the discrete data streams (e.g., audio signals) conveyed over the plurality of signal paths at various points within the system from sound capture to sound reproduction. For example, when the number of signal paths output from the sound detectors is equal to the number of amplifier systems and/or loudspeaker systems, the function of the annunciator can be passive (no combining of signals is necessarily performed). When the number of outputs from the sound detectors is greater than the number of amplifier systems and/or loudspeaker systems, the annunciator can combine selected signal paths based on predetermined criteria, either automatically or under manual control by a user. For example, if there are N sound sources and N sound detectors, but only N-i inputs to the encoder are desired, a user may elect to combine two signal paths in a manner described below. The operation and advantages of these components are further detailed below.

FIG. 2 schematically depicts a sound reproduction system according to a preferred embodiment of the invention. It can be used with the sound capture/recording system of FIG. 1 or with other systems. This portion of the system may be used to read and reproduce stored audio signals or may be used to receive audio signals that are not stored (e.g., a live feed from the sound detectors $SD_1$-$SD_N$). When it is desired to reproduce sounds based on the stored audio signals, the stored audio signals are read by a reader/decoder 50. The reader portion may include any suitable device (e.g., an optical reader) for retrieving the stored audio signals from the storage medium 40 and, if necessary or desired, any suitable decoder may be used. Preferably, such a decoder will be compatible with the encoder 30. The separate audio signals from the reader/decoder 50 are supplied over signal paths to an amplifier network 70 and then to a loudspeaker network 80 as detailed below. Prior to being supplied to the amplifier network 70, the audio signals from reader/decoder 50 may be supplied to annunciator 60.

For simplicity, it will be assumed that N audio signals are input to annunciator 60 and that N audio signals are output therefrom. It is to be understood, however, that different numbers of signals can be input to and output from annunciator 20. If for example, only five audio signals are output from annunciator 60, only five amplifier systems and five loudspeaker systems are necessary. Additionally, the number of audio signals output from annunciator 60 may be dictated by the number of amplifier or loudspeaker systems available. For example, if a system only has four amplifier systems and four loudspeaker systems, it may be desirable for the annunciator to output only four audio signals. For example, the user may elect to build a system modularly (i.e., adding amplifier systems and loudspeaker systems one or more at a time to build up to N such systems). In this event, the annunciator facilitates this modularity. The user interface 55 enables the user to select which audio signals should be combined, if they are to be combined, and to control other aspects of the systems as detailed below.

Figure 3:
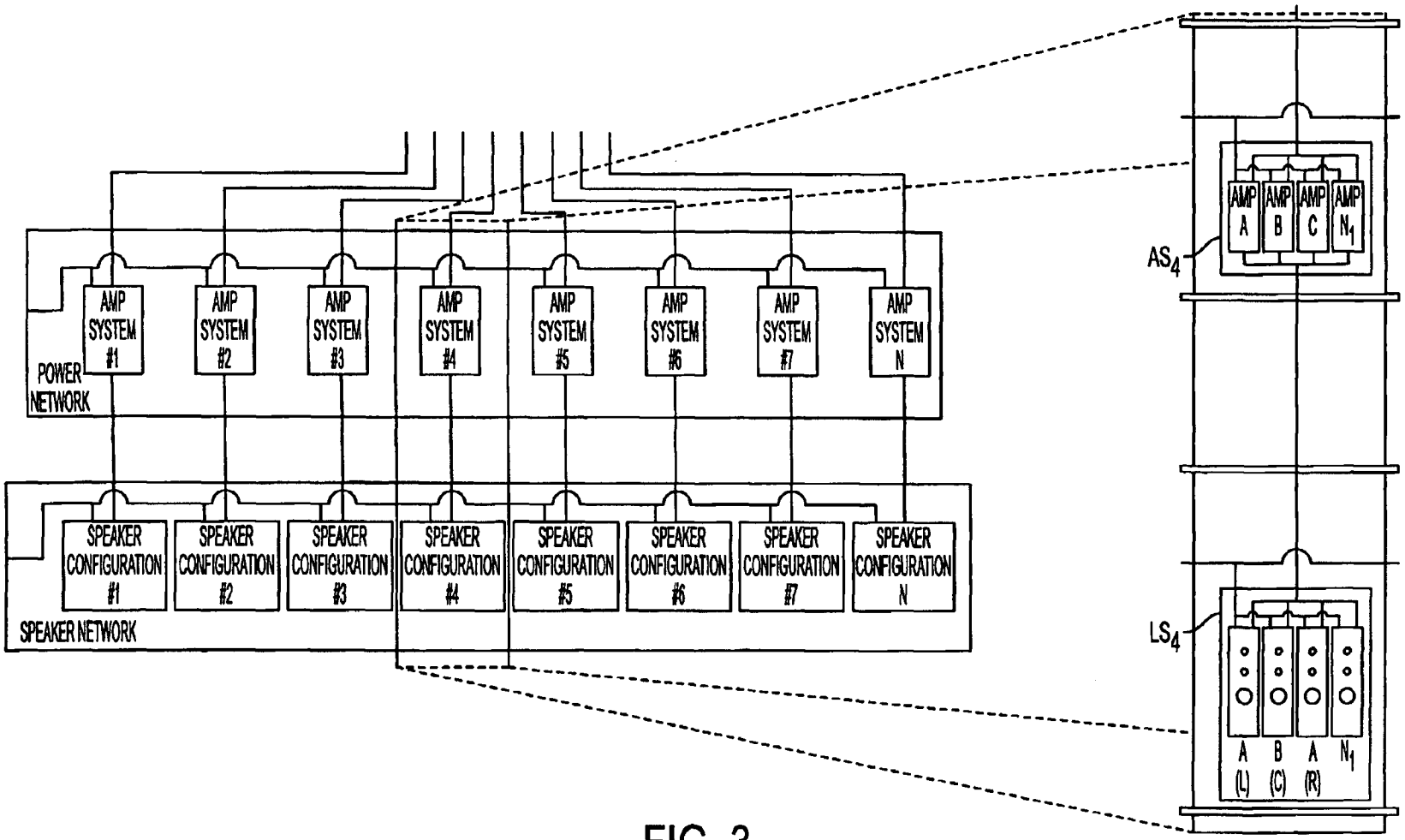
FIG. 3 is a schematic illustration of an exploded view of an amplifier system and loudspeaker system for one signal path according to one embodiment of the invention.

Referring to FIGS. 2 and 3, the amplifier network 70 preferably comprises a plurality of amplifier systems $AS_1$-$AS_N$ each of which separately amplifies the audio signals on one of the N signal paths. As shown in FIG. 3, each amplifier system may comprise one or more amplifiers (A-N) for separately amplifying the audio signals on one of the N signal paths. From the amplifier network 70, each of the audio signals are supplied over separate signal paths to a loudspeaker network 80. The loudspeaker network 80 comprises N loudspeaker systems $LS_1$-$LS_N$ each of which separately reproduces the audio signals on one of the N signal paths. As shown in FIG. 3, each loudspeaker system preferably includes one or more loudspeakers or loudspeaker clusters (A-N) for separately reproducing the audio signals on each of the N signal paths.

Preferably, each loudspeaker or loudspeaker cluster is customized for the specific types of sounds produced by the sound source or groups of sound sources associated with its signal path. Preferably, each of the amplifier systems and loudspeaker systems are separately controllable so that the audio signals sent over each signal path can be controlled individually by the user or automatically by the system as detailed below. More preferably, each of the individual amplifiers (A-N) and each of the individual loudspeakers (A-N) are each separately controllable. For example, it is preferable that each of amplifiers A-N for amplifier system $AS_1$ is separately controllable to be on or off, and if on to have variable levels of amplification from low to high. In this way, power levels of audio signals on that signal path may be stepped up or down by turning on specific amplifiers within an amplifier system and varying the amplification level of one or more of the amplifiers that are on. Preferably, each of the amplifiers of an amplifier system is customized to amplify the audio signals to be transmitted through that amplifier system. For example, if the amplifier system is connected in a signal path that is to receive audio signals corresponding to sounds that consist of primarily low frequencies (e.g., bass sounds from a drum), each of the amplifiers of that amplifier system may be designed to optimally amplify low frequency audio signals. This is an advantage over using amplifiers that are generic to a broad range of frequencies. Moreover, by providing multiple amplifiers within one amplifier system for a specific type of audio signal (e.g., sounds that consist of primarily low frequencies), the power level output from the amplifier system can be stepped up or down by turning on or off individual amplifiers. This is an advantage over using a single amplifier that must be varied from very low power levels to very high power levels. Similar advantages are achieved by using multiple loudspeakers within each loudspeaker system. For example, two or more loudspeakers operating at or near a middle portion of a power range will reproduce sounds with less distortion than a single loudspeaker at an upper portion of its power range. Additionally, loudspeaker arrays may be used to effect directivity control over 360 degrees or variations thereof.

As also shown in FIG. 2, the invention may include a user interface 55 to provide a user with the ability to manually manipulate the audio signals on each signal path independently of the audio signals on each of the other signal paths. This ability to manipulate includes, but is not limited to, the ability to manipulate: 1) master volume control (e.g., to control the volume or power on all signal paths); 2) independent volume control (e.g., to independently control the volume or power on one or more individual signal paths): 3) independent on/off power control (e.g., to turn on/off individual signal paths): 4) independent frequency control (e.g., to independently control the frequency or tone of individual signal paths): 5) independent directional and/or sector control (e.g., to independently control sectors within individual signal paths and/or control over the annunciator.

Preferably, the user interface 55 includes a master volume control (MC) and N separate controls ($C_1$-$C_N$) for the N signal paths. A dynamics override control (DO) may also be provided to enable a user to manually override the automatic dynamic control of dynamic controller 90.

Also shown in FIG. 2 is a dynamic control module 90, which can provide separate control of the amplifier systems ($AS_1$-$AS_N$), the loudspeaker systems ($LS_1$-$LS_N$) and the annunciators 20, 60. Dynamics control module 90 is preferably connected to the user interface 55 (e.g., directly or via annunciator 60) to permit user interaction and manual control of these components.

According to one aspect of the invention, dynamics control module 90 includes a controller 91, one or more annunciator interfaces 92, one or more amplifier system interfaces 93, one or more loudspeaker interfaces 94 and a feedback control interface 95. The annunciator interface 92 is connected to one or more annunciators (20, 60). The amplifier interface 93 is operatively connected to the amplifier network 70. The loudspeaker interface 94 is connected to the loudspeaker network 80. Dynamics control module 90 controls the relationship among the amplifier systems and loudspeaker systems and the individual components therein. Dynamics control module 90 may receive feedback via the feedback control interlace 95 from the amplification network 70 and/or the loudspeaker network 80. Dynamics control module 90 processes signals from amplification network 70 and/or sounds from loudspeaker network 80 to control amplification network 70 and loudspeaker network 80 and the components thereof. Dynamics control module 90 preferably controls the power relationship among the amplifier systems of the amplification network 70. For example, as power or volume of an amplifier system is increased, the dynamic response of a particular audio signal amplified by that amplifier system may vary according to characteristics of that audio signal. Moreover, as the overall power of the amplifier network is increased or decreased, the dynamic relationship among the audio signals in the separate signal paths may change. Dynamics control module 90 can be used to discretely adjust the power levels of each amplifier system based on predetermined criteria. An example of the criteria on which dynamics control module 90 may base its adjustment is the individual sound signal power curves (e.g., optimum amplification of audio signals when ramping power up or down according to the power curves of the original sound event). Module 90 can discretely activate, deactivate, or change the power level of, any of the amplification systems 70 $AS_1$-$AS_N$ and preferably, the individual components (A-N) of any given amplifier system $AS_1$-$AS_1$.

Module 90 can also control the loudspeaker network 80 based on predetermined criteria. Preferably, module 90 can discretely activate, deactivate, or adjust the performance level of each individual loudspeaker system and/or the individual loudspeakers or loudspeaker clusters (A-N) within a loudspeaker system ($LS_1$-$LS_N$ Thus, the system components are capable of being individually manipulated to optimize or customize the amplification and reproduction of the audio signals in response to dynamic or changing external criteria (e.g., power), sound source characteristics (e.g., frequency bandwidth for a given source), and internal characteristics (e.g., the relationship between the audio signals of the different signal paths).

The user interface 55 and/or dynamic controller 90 enables any signal path or component to be turned on/off or to have its power level controlled either automatically or manually. The dynamic controller 90 also enables individual amplifiers or loudspeakers within an amplifier system or loudspeaker system to be selectively turned on depending, for example, on the dynamics of the signals. For example, it is advantageous to be able to turn on two amplifiers within one system to increase the power level of a signal rather than maxing out the amplification of a single amplifier which can cause undesired distortion.

As will be apparent from the foregoing description, whether the N separate audio signals are recorded first and then reproduced or reproduced without first being recorded, the invention enables various types of control to be effected to enable the reproduced sounds to have desired characteristics. According to one embodiment, the N separate audio signals output from the sound detectors ($SD_1$-$SD_N$) are maintained as N separate audio signals throughout the system and are provided as N separate inputs to the N loudspeaker systems. Typically, it is desired to do this to accurately reproduce the originally captured sounds and avoid problems associated with mixing of audio signals and/or sounds. However, as detailed herein various types of selective control over the audio signals can be effected by using acoustical manifold 10, one or more annunciators (20, 60), a user interface 55 and a dynamic controller 90 to enable various types of desired mixing of audio signals to permit modular expansion of a system. For example, one or more acoustical manifolds 10 can be used at various points in the system to enable audio signals on one signal path to be switched to another signal path. For example, if the sounds produced by SS1 are captured by SD1 and converted to audio signals on signal path SP1, it may be desired to ultimately provide these audio signals to loudspeaker system $LS_4$ (e.g., since the loudspeakers may be customized for a particular type of sound source). If so, then the audio signals input to the acoustical manifold 10 on SP1 are routed to output 4 of the acoustical manifold 10. Other signals may be similarly switched to other signal paths at various points within the system. Thus, if the characteristics of the sounds produced by a sound source (SS) as captured by a sound detector (SD) change, the acoustical manifold 10 enables those signals to be routed to an amplifier system and/or loudspeaker system that is customized for those characteristics, without reconfiguring the entire system.

One or more annunciators (e.g., 20, 60) may be used to selectively combine two or more audio signals from separate signal paths or it can permit the N separate audio signals to pass through all or portions of the system without any mixing of the audio signals. One advantage of this is where there are more sound detectors then there are amplifier systems or loudspeaker systems. Another is when there are less amplifier systems and/or loudspeaker systems than there are signal paths. In either case (or in other cases) it may be desired to selectively combine audio signals corresponding to the sounds produced by two or more sound sources. Preferably, if such sounds or audio signals are mixed, selective mixing is performed so that signals having common characteristics (e.g., frequency, directivity, etc.) are mixed. This also enables modular expansion of the system.

As will be apparent from the foregoing, during the entire process from the detection of the sound to its reproduction by the loudspeakers, each of the audio signals corresponding to sounds produced by a sound source are preferably maintained separate from other sounds/audio signals produced by another sound source. Unless specifically desired to do so, the signals are not mixed. In this way, many of the problems with prior systems are avoided. While the foregoing discussion addresses the use of separate signal paths to keep the audio signals separate, it is to be understood that this may also be accomplished by multiplexing one or more signals over a signal path while maintaining the information separate (e.g., using time division multiplexing).

If desired, a feedback system 51 (FIG. 2) may be provided. If used, it can serve at least two primary functions. The first relates to acoustical data acquisition and active feedback transmission. This is accomplished, for example, by use of diagnostic transducers $DT_1$-$DT_N$ that measure the output data (e.g., sounds) exiting each port of the system (e.g., each loudspeaker system), providing feedback to the dynamics control module 90 via the feedback control interface 95. The dynamics control module 90 then controls the system components according to a predetermined control scheme. A second function relates to the dynamic control schemes. The dynamics control module 90 controls the macro/micro relationships between playback system components, systems, and subsystems under dynamic conditions. The dynamics module 90 controls the micro relationships among the components (e.g., amplifiers and/or loudspeakers within a single signal path) and the macro relationships among the separate signal paths. The micro relationships include the relationship between individual amplifiers within a given amplifier system (e.g., where each signal path has its own discrete amplifier system with one or more amplifiers) and/or the micro relationships between individual loudspeakers within a given loudspeaker system (e.g., where each signal path has its own discrete loudspeaker system with one or more loudspeakers). The macro relationships include the relationships among the amplifier systems and loudspeaker systems of the separate signal paths. Such control is implemented according to predetermined criteria or control schemes (e.g., based on the characteristics the original sound, the acoustics of the venue, the desired directivity patterns, etc.). Such control schemes can be embedded in the audio signals of each signal path, permanently hard-coded into the amplifier system for each signal path, or determined by active feedback signals originating from feedback system 100 based on the actual sounds produced. The dynamics control module 90 can control the macro relationships between the discrete presentation channels as the dynamics of systems change (e.g., changes in master volume control, changes in the playback system configuration, changes in the venue dynamics, changes in recording methods/accuracies, changes in music type, etc.). Diagnostic channels can include a number of active and passive feedback paths linking the output data from each signal path to a control module which, in turn, communicates a predetermined control scheme to each signal path and/or specific discrete signal paths. A purpose of the diagnostic system is to provide a method for controlling the interaction between individual sounds within a given sound field as the dynamics of each sound change in proportion to changes in volume levels and/or changes in the dynamics of the performance venue.

Figure 4:
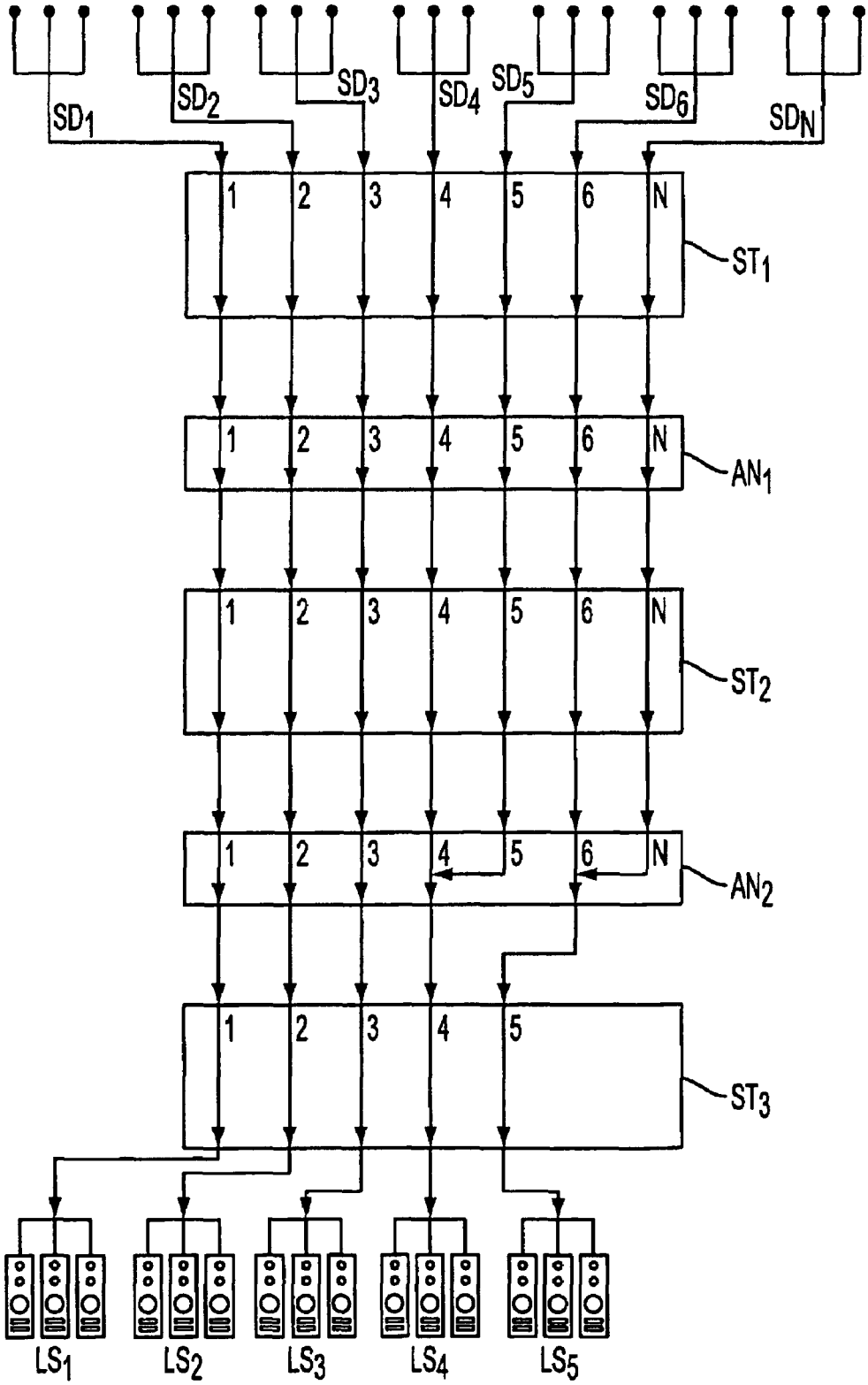
FIG. 4 is a schematic illustration of an example configuration for an annunciator according to one embodiment of the invention.
Figure 5:
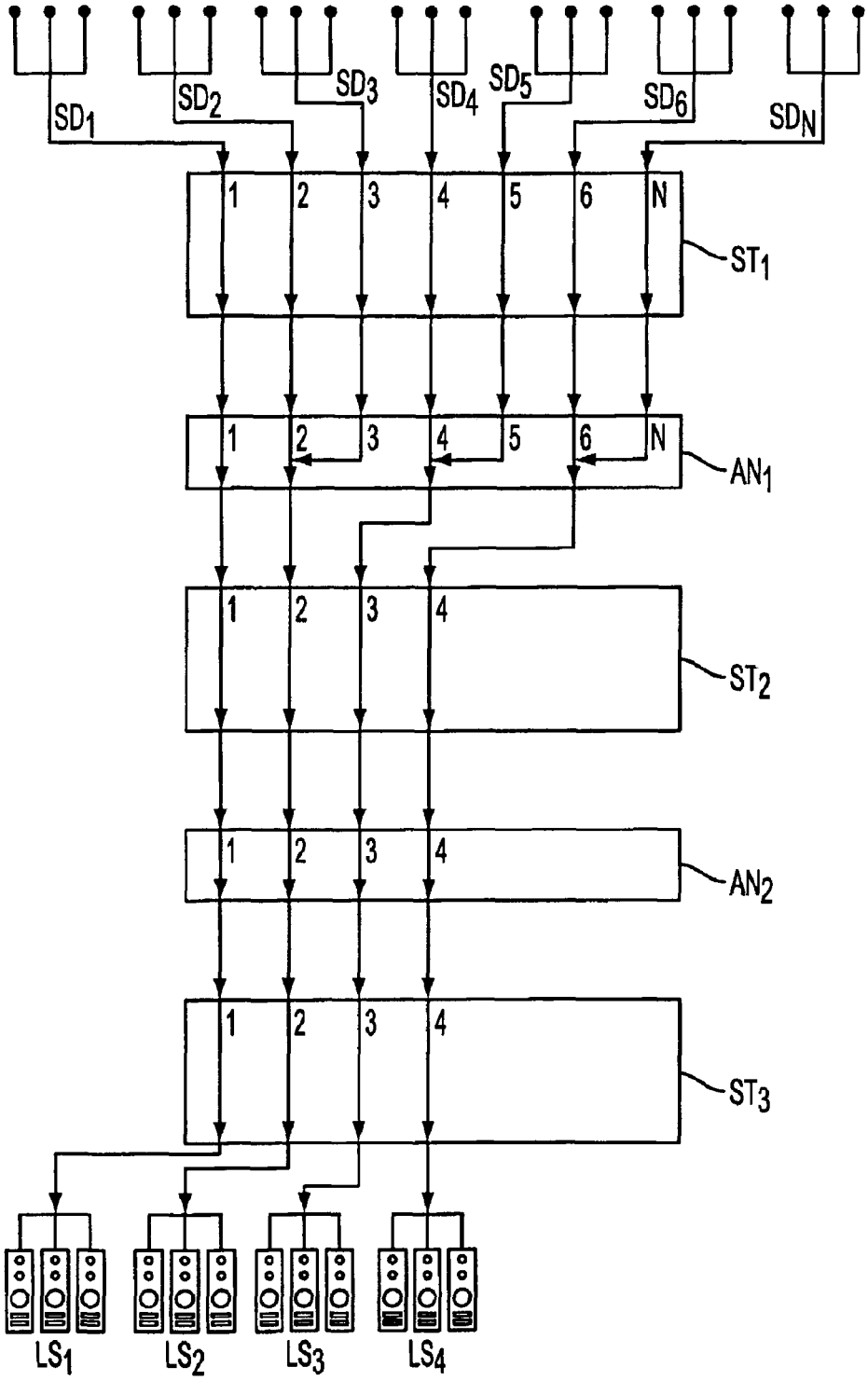
FIG. 5 is a schematic illustration of an example configuration for an annunciator according to one embodiment of the invention.
Figure 6:
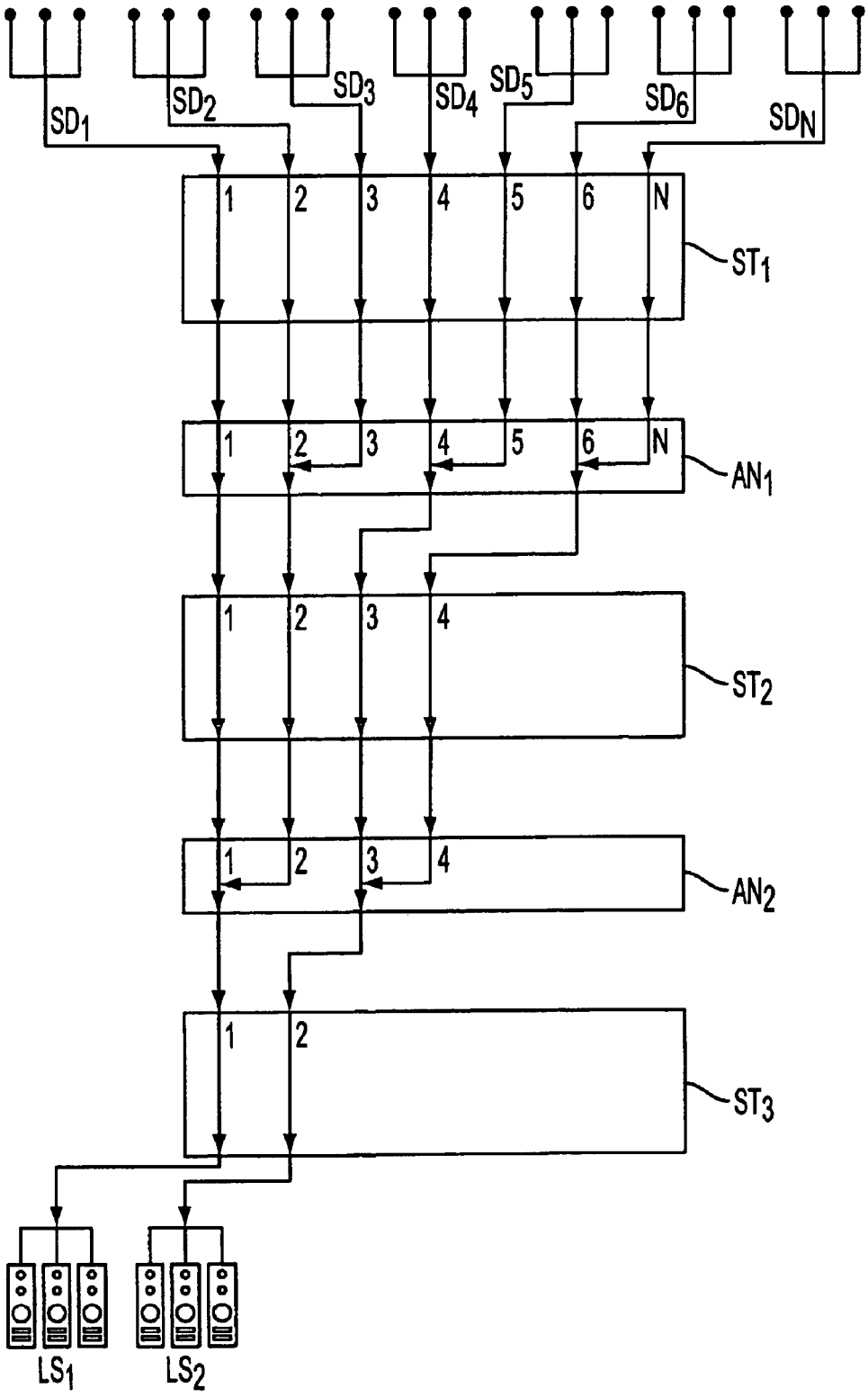
FIG. 6 is a schematic illustration of an example configuration for an annunciator according to one embodiment of the invention.

By way of example, FIGS. 4, 5 and 6 depict various configurations for a system having multiple stages ($ST_1$-$ST_3$) and multiple annunciators ($AN_1$-$AN_3$). FIG. 4 depicts N signals input but only five outputs. FIG. 5 depicts N inputs with four outputs. FIG. 6 depicts N inputs and only two outputs. In each of FIGS. 4-6, the various stages can be Capture, Transmission (e.g., recording or live feed) and Presentation stages. Other stages can be used. For example, the Capture stage may include a first number of signal paths to capture the sounds produced by the sound sources. Preferably, there is one signal path for each sound source, but more or less may be used. The Transmission stage may include a second number of signal paths between the Capture stage and the recording medium and/or other portions (e.g., playback) of the system or transmitted to a "live feed" network. The second number of signal paths may be greater than, less than or equal to the first number of signal paths. The Presentation stage may include a third number of signal paths for reproduction of the sounds so that separate amplifier and loudspeaker systems may be used for each signal path. The third number of signal paths may be greater than, less than or equal to the first and or second number of signal paths. Preferably, the first, second and third number of signal paths are equal to enable independence throughout the Capture, Transmission and Presentation stages. When the number of signal paths are not equal, however, the annunciator module serves to control the signal paths and routing of signals thereover.

For purposes of example only, the sound sources $SS_1$-$SS_N$ may include keyboards (e.g., a piano), strings (e.g., a guitar), bass (e.g., a cello), percussion (e.g., a drum), woodwinds (e.g., a clarinet), brass (e.g., a saxophone), and vocals (e.g., a human voice). These seven identified sound sources represent the seven major groups of musical sound sources. The invention does not require seven sound sources. More or less can be used. of course, other sound sources or groups of sound sources may be also be used as indicated by box $SS_N$. In the general case, N sound sources may be used where N is an integer greater than 1, or equal, but preferably greater than 1. It is well known that each of these seven major groups of musical sound sources have different audio characteristics and that, while each individual sound source within a group may have significant tonal differences (i.e., the violin and guitar), the sound sources within a group may have one or more common characteristics.

According to one aspect of the invention, the sounds produced by each of the N sound sources $SS_1$-$SS_N$ are separately detected by one of a plurality of sound detectors $SD_1$-$SD_N$, for example, N microphones or microphone sets. Preferably, the sound detectors are directional to detect sound from substantially only one or selected ones of the plurality of sound sources. Each of the N sound detectors preferably detect sounds produced by one of the N sound sources and converts the detected sounds to audio signals. If each of the N sound sources simultaneously produces sound, then N separate audio signals will exist. Each sound detector may comprise one or more sound detection devices. For example, each sound detector may comprise more than one microphone.

According to a preferred embodiment, three microphones (left, right and center) are used for each sound source. As detailed below, the use of these microphones is just one example of the use of a plurality of sound detection devices for each sound source. In other situations, more or less may be desired. For example, it may be desirable to surround a source with a plurality of microphones to obtain more directional information. The audio signals output from each of the N sound detectors or sound detection devices are supplied over a separate signal path as described above.

Each signal path may comprise multiple channels. For example, as shown in FIG. 1, each signal path may include a plurality of channels, (e.g., a left, right and center channel). In the general case, each signal path comprises M channels, where M is an integer greater than or equal to 1. However, it is not necessary for each signal path to have the same number of channels. For simplicity of discussion, it will be assumed that there are M channels for each of the N signal paths.

The number of channels for a particular signal path need not be limited to three. More or fewer channels may be incorporated as desired. For example, a plurality of channels may be used to provide directional control (e.g., left, right and center). However, some or all of the channels may be used to provide frequency separation or for other purposes. For example, if three channels are used, each of the three channels could represent one musical instrument within a given group. For example, the musical group may be "strings" (e.g., if the event being recorded has two violins and one acoustical guitar). In this case, one channel could be used for one violin, another channel could be used for the second violin, and the third channel could be used for the acoustical guitar. Another use of separate channels is to enable power stepping, where one channel is used for audio signals up to a first level, then a second channel is added as the power level is increased above the first level, and so on. This method helps regulate the optimum efficiency level for each of the loudspeakers used in the loudspeaker network.

The recording process, if used, generally involves separately recording the M×N audio signals onto the recording medium 40 to enable the M×N signals to be subsequently read out and reproduced separately. The recording and read out may be accomplished in a standard manner by providing independent recording/reading heads for each signal path/channel or by time-division multiplexing the audio signals through one or more recording/reading heads onto or from M×N tracks of the recording medium.

According to another aspect of the invention, the separately recorded audio signals are separately reproduced. As shown in FIG. 2, the reproduction of the audio signals includes separately retrieving the M×N signals by playback mechanism 50 (and performing any necessary or desired decoding). Then the audio signals are supplied over N separate signal paths (where each signal path may have M channels) to an amplifier network 70 having N amplifier systems and providing the output of the N amplifier systems to loudspeaker network 80, which preferably comprises N loudspeaker systems. Each loudspeaker system may comprise M×N loudspeakers or a greater or lesser number of loudspeakers, as detailed below.

According to one embodiment of the invention, each sound source may be a group of sound sources instead of an individual source. Preferably, each group includes sound sources with one or more similar characteristics. For example, these characteristics may include musical groupings (keyboards, strings, bass, percussion, woodwinds, brass group, and vocals), frequency bandwidth, or other characteristics. Thus, if more than one type of string instruments is used, it may be acceptable to use one signal path for the string instruments and separate signal paths, etc. for other sound sources or groups of sound sources. This still enables recognition of the advantages derived from the use of customized loudspeaker systems since sounds with common characteristics are produced by the same loudspeaker system.

According to one embodiment, the criteria used for grouping sound sources is related to a common dynamic behavior of particular audio signals when they are amplified. For example, a particular amplifier may have different distortion effects on different audio signals having different characteristics (e.g., frequency bandwidth). Thus, it also may be preferable to use a different type of amplifier system for different types of audio signals. Another criteria used for grouping sound sources is common directivity patterns. For instance, "horns" are very directional and can be grouped together while "keyboard instruments" are less directional than horns and would not be compatible with the "horns" customized speaker configuration, and therefore would not be grouped together with horns.

The sound system need not be limited to any particular number of signal paths. The number of signal paths can be increased or decreased to accommodate larger or smaller numbers of individual sound sources or sound groups. Further, application of the system is not limited to musical instruments and vocals. The sound system has many applications including standard movie theater sound systems, special movie theaters (e.g., OmniMax, IMAX, Expos) cyberspace/computer music, home entertainment, automobile and boat sound systems, modular concert systems (e.g., live concerts, virtual concerts), auto system electronic crossover interface, home system electronic crossover interface, church systems, audio/visual systems (e.g., advertising billboards, trade shows), educational applications, musical compositions, and HDTV applications, to name but a few.

Preferably, loudspeaker network 80 consists of several loudspeaker systems, each including a plurality of loudspeakers or loudspeaker clusters each of which is used for one of the signal paths. Each loudspeaker cluster includes one or more loudspeakers customized for the type of sounds that it is used to reproduce. A given loudspeaker cluster may be responsive to the power change of the corresponding amplification system. For example, if the power level supplied to a given loudspeaker network is below a first predetermined level, one or a group of loudspeaker components may be active to reproduce sound. If the power level exceeds the first predetermined level, a second or second group of loudspeaker components may become active to reproduce the sound. This avoids overloading the first loudspeaker (or first group of loudspeakers) and also avoids under powering the loudspeakers(s). Thus, depending on the power level of the audio signals on one (or more) of the signal paths, the individual loudspeakers within a given loudspeaker cluster can be automatically activated or deactivated (e.g., manually or automatically under control of the dynamics control module 90). Furthermore, a control signal embedded in the audio signal can identify the type of sound being delivered and thus trigger the precise group(s) of speakers, within a loudspeaker cluster, that most closely represents the characteristics of that signal (e.g., actual directivity pattern(s) of the sound source(s) being reproduced). For example, if the sound source being reproduced is a trumpet, the embedded control signal would trigger a very narrow group of speakers within the larger loudspeaker network, since the directivity of an actual trumpet is relatively narrow. Similar control can occur for other characteristics.

The audio signals, if digital, preferably are encoded and decoded at a sample rate of at least 88.2 KHz and 20-bit linear quantitization. Other sample rates and quantitization rates can be used however.

Figure 7:
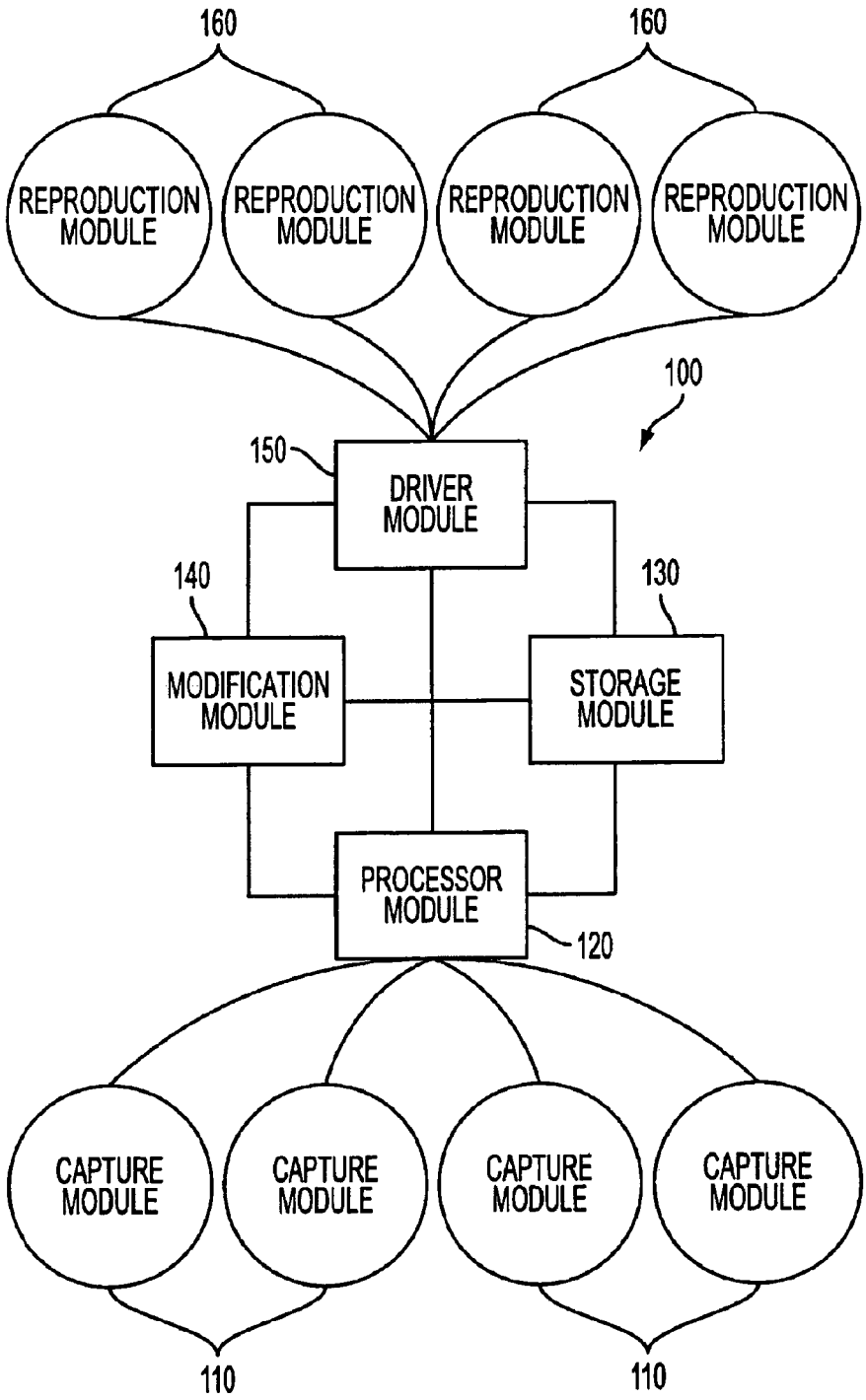
FIG. 7 is a schematic of a system according to an embodiment of the invention.

FIG. 7 illustrates a system according to an embodiment of the invention. Capture module 110 may enclose sound sources and capture a resultant sound. According to an embodiment of the invention, capture module 110 may comprise a plurality or enclosing surfaces $\Gamma_a$, with each enclosing surface $\Gamma_a$ associated with a sound source. Sounds may be sent from capture module 110 to processor module 120. According to an embodiment of the invention, processor module 120 may be a central processing unit (CPU) or other type of processor. Processor module 120 may perform various processing functions, including modeling sound received from capture module 110 based on predetermined parameters (e.g. amplitude, frequency, direction, formation, time, etc.). Processor module 120 may direct information to storage module 130. Storage module 130 may store information, including modeled sound. Modification module 140 may permit captured sound to be modified. Modification may include modifying volume, amplitude, directionality, and other parameters. Driver module 150 may instruct reproduction modules 160 to produce sounds according to a model. According to an embodiment of the invention, reproduction module 160 may be a plurality of amplification devices and loudspeaker clusters, with each loudspeaker cluster associated with a sound source. Other configurations may also be used. The components of FIG. 7 will now be described in more detail.

Figure 8:
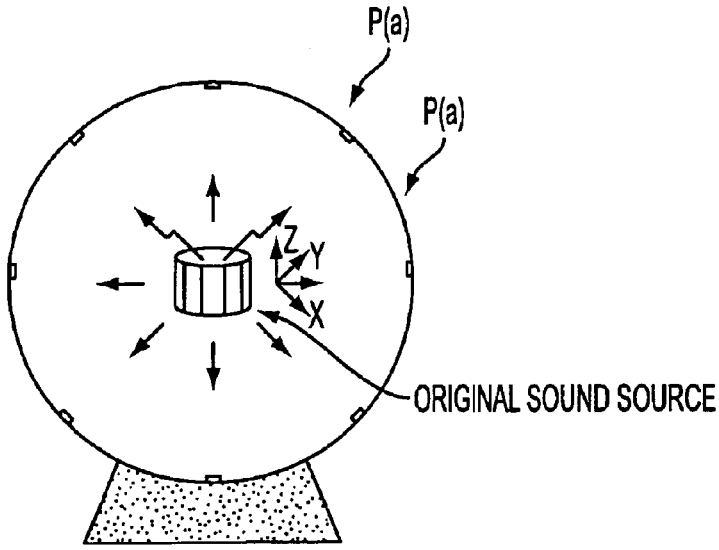
FIG. 8 is a perspective view of a capture module for capturing sound according to an embodiment of the invention.

FIG. 8 depicts a capture module 110 for implementing an embodiment of the invention. As shown in the embodiment of FIG. 8, one aspect of the invention comprises at least one sound source located within an enclosing (or partially enclosing) surface $\Gamma_a$, which for convenience is shown to be a sphere. Other geometrically shaped enclosing surface $\Gamma_a$ configurations may also be used. A plurality of transducers are located on the enclosing surface $\Gamma_a$ at predetermined locations. The transducers are preferably arranged at known locations according to a predetermined spatial configuration to permit parameters of a sound field produced by the sound source to be captured. More specifically, when the sound source creates a sound field, that sound field radiates outwardly from the source over substantially 360°. However, the amplitude of the sound will generally vary as a function of various parameters, including perspective angle, frequency and other parameters. That is to say that at very low frequencies (−20 Hz), the radiated sound amplitude from a source such as a speaker or a musical instrument is fairly independent of perspective angle (omnidirectional). As the frequency is increased, different directivity patterns will evolve, until at very high frequency (−20 kHz), the sources are very highly directional. At these high frequencies, a typical speaker has a single, narrow lobe of highly directional radiation centered over the face of the speaker, and radiates minimally in the other perspective angles. The sound field can be modeled at an enclosing surface $\Gamma_a$ by determining various sound parameters at various locations on the enclosing surface $\Gamma_a$. These parameters may include, for example, the amplitude (pressure), the direction of the sound field at a plurality of known points over the enclosing surface and other parameters.

According to one embodiment of the invention, when a sound field is produced by a sound source, the plurality of transducers measures predetermined parameters of the sound field at predetermined locations on the enclosing surface over time. As detailed below, the predetermined parameters are used to model the sound field.

Figure 9:
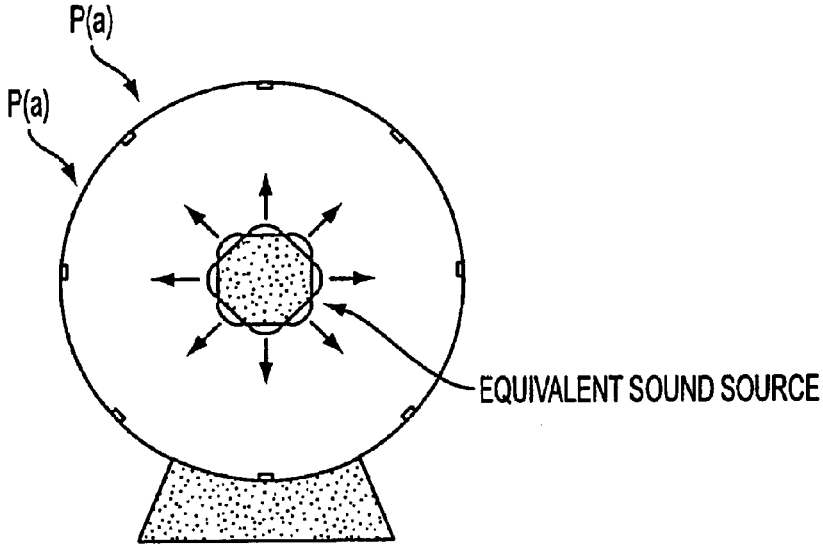
FIG. 9 is a perspective view of a reproduction module according to an embodiment of the invention.

For example, assume a spherical enclosing surface $\Gamma_a$ with N transducers located on the enclosing surface $\Gamma_a$. Further consider a radiating sound source surrounded by the enclosing surface, $\Gamma_a$ (FIG. 8). The acoustic pressure on the enclosing surface $\Gamma_a$ due to a soundfield generated by the sound source will be labeled P(a). It is an object to model the sound field so that the sound source can be replaced by an equivalent source distribution such that anywhere outside the enclosing surface $\Gamma_a$, the sound field, due to a sound event generated by the equivalent source distribution, will be substantially identical to the sound field generated by the actual sound source (FIG. 9). This can be accomplished by reproducing acoustic pressure P(a) on enclosing surface $\Gamma_a$ with sufficient spatial resolution. If the sound field is reconstructed on enclosing surface $\Gamma_a$, in this fashion, it will continue to propagate outside this surface in its original manner.

While various types of transducers may be used for sound capture, any suitable device that converts acoustical data (e.g., pressure, frequency, etc.) into electrical, or optical data, or other usable data format for storing, retrieving, and transmitting acoustical data" may be used.

As illustrated in FIG. 7, processor module 120 may be central processing unit (CPU) or other processor. Processor module 120 may perform various processing functions, including modeling sound received from capture module 110 based on predetermined parameters (e.g. amplitude, frequency, direction, formation, time, etc.), directing information, and other processing functions. Processor module 120 may direct information between various other modules within a system, such as directing information to one or more of storage module 130, modification module 140, or driver module 150.

Storage module 130 may store information, including modeled sound. According to an embodiment of the invention, storage module may store a model, thereby allowing the model to be recalled and sent to modification module 140 for modification, or sent to driver module 150 to have the model reproduced.

Modification module 140 may permit captured sound to be modified. Modification may include modifying volume, amplitude, directionality, and other parameters. While various aspects of the invention enable creation of sound that is substantially identical to an original sound field, purposeful modification may be desired. Actual sound field models can be modified, manipulated, etc. for various reasons including customized designs, acoustical compensation factors, amplitude extension, macro/micro projections, and other reasons. Modification module 140 may be software on a computer, a control board, or other devices for modifying a model.

Driver module 150 may instruct reproduction modules 160 to produce sounds according to a model. Driver module 150 may provide signals to control the output at reproduction modules 160. Signals may control various parameters of reproduction module 160, including amplitude, directivity, and other parameters. FIG. 9 depicts a reproduction module 160 for implementing an embodiment of the invention. According to an embodiment of the invention, reproduction module 160 may be a plurality of amplification devices and loudspeaker clusters, with each loudspeaker cluster associated with a sound source.

Preferably there are N transducers located over the enclosing surface $\Gamma_a$ of the sphere for capturing the original sound field and a corresponding number N of transducers for reconstructing the original sound field. According to an embodiment of the invention, there may be more or less transducers for reconstruction as compared to transducers for capturing.

Other configurations may be used in accordance with the teachings of the invention.

Figure 10:
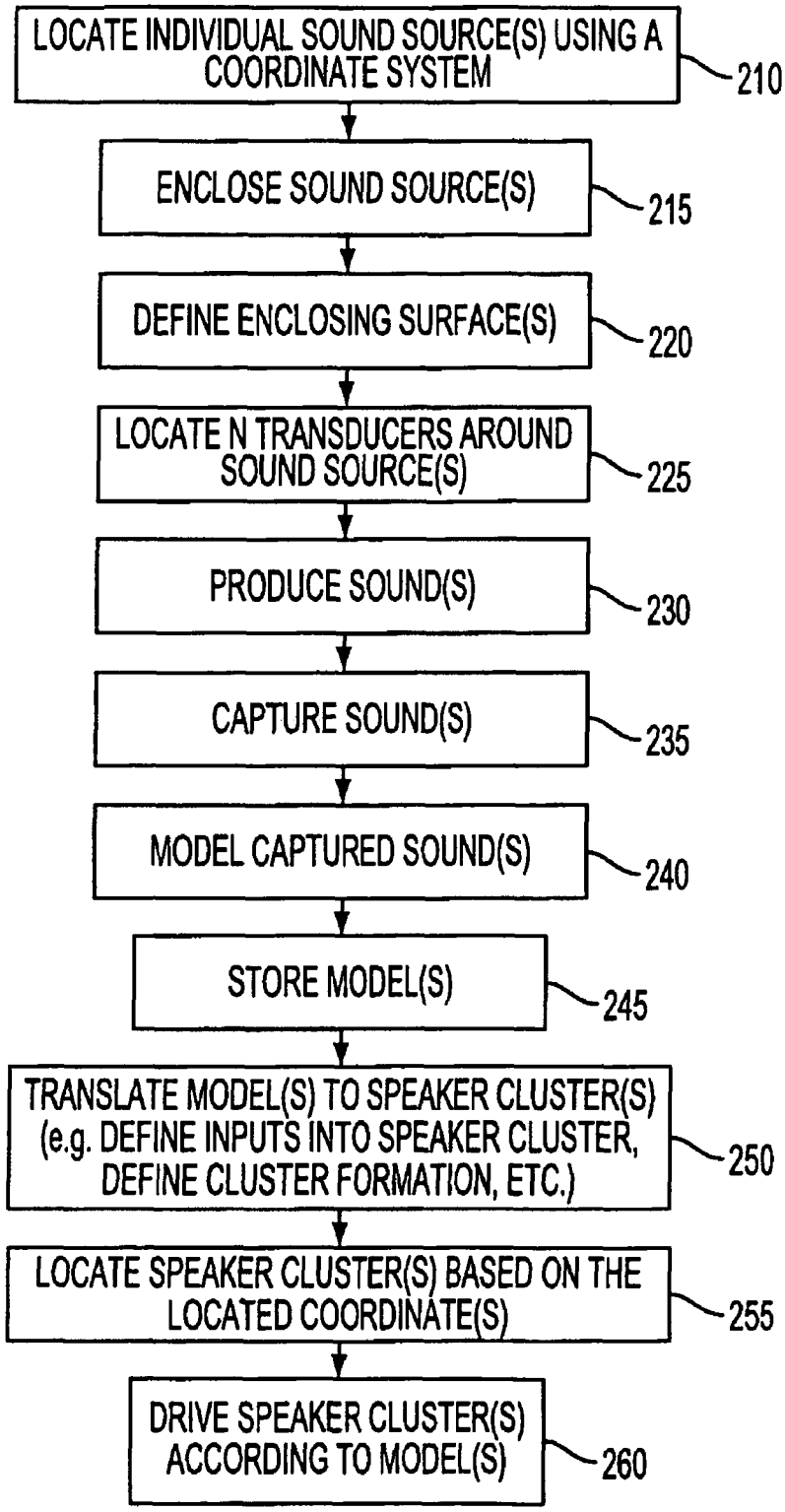
FIG. 10 is a flow chart illustrating operation of a sound field representation and reproduction system according to the embodiment of the invention.

FIG. 10 illustrates a flow chart according to an embodiment of the invention wherein a number of sound sources are captured and recreated. Individual sound source(s) may be located using a coordinate system at step 210. Sound source(s) may be enclosed at step 215, enclosing surface $\Gamma_a$ may be defined at step 220, and N transducers may be located around enclosed sound source(s) at step 225. According to an embodiment of the invention, as illustrated in FIG. 8, transducers may be located on the enclosing surface $\Gamma_a$. Sound(s) may be produced at step 230, and sound(s) may be captured by transducers at step 235. Captured sound(s) may be modeled at step 240, and model(s) may be stored at step 245. Model(s) may be translated to speaker cluster(s) at step 250. At step 255, speaker cluster(s) may be located based on located coordinate(s). According to an embodiment of the invention, translating a model may comprise defining inputs into a speaker cluster. At step 260, speaker cluster(s) may be driven according to each model, thereby producing a sound. Sound sources may be captured and recreated individually (e.g. each sound source in a band is individually modeled) or in groups. Other methods for implementing the invention may also be used.

According to an embodiment of the invention, as illustrated in FIG. 8, sound from a sound source may have components in three dimensions. These components may be measured and adjusted to modify directionality. For this reproduction system, it is desired to reproduce the directionality aspects of a musical instrument, for example, such that when the equivalent source distribution is radiated within some arbitrary enclosure, it will sound just like the original musical instrument playing in this new enclosure. This is different from reproducing what the instrument would sound like it one were in fifth row center in Carnegie Hall within this new enclosure. Both can be done, but the approaches are different. For example, in the case of the Carnegie Hall situation, the original sound event contains not only the original instrument, but also its convolution with the concert hall impulse response. This means that at the listener location, there is the direct field (or outgoing field) from the instrument plus the reflections of the instrument off the walls of the hall, coming from possibly all directions over time. To reproduce this event within a playback environment, the response of the playback environment should be canceled through proper phasing, such that substantially only the original sound event remains. However, we would need to fit a volume with the inversion, since the reproduced field will not propagate as a standing wave field which is characteristic of the original sound event (i.e., waves going in many directions at once). If, however, it is desired to reproduce the original instrument's radiation pattern without the reverberatory effects of the concert hall, then the field will be made up of outgoing waves (from the source), and one can fit the outgoing field over the surface of a sphere surrounding the original instrument. By obtaining the inputs to the array for this case, the field will propagate within the playback environment as if the original instrument were actually playing in the playback room.

So, the two cases are as follows:

1. To reproduce the Carnegie Hall event, one needs to know the total reverberatory sound field within a volume, and fit that field with the array subject to spatial Nyquist convergence criteria. There would be no guarantee however that the field would converge anywhere outside this volume.

2. To reproduce the original instrument alone, one needs to know the outgoing (or propagating) field only over a circumscribing sphere, and fit that field with the array subject to convergence criteria on the sphere surface. If this field is fit with sufficient convergence, the field will continue to propagate within the playback environment as if the original instrument were actually playing within this volume.

Thus, in one case, an outgoing sound field on enclosing surface $\Gamma_a$ has either been obtained in an anechoic environment or reverberatory effects of a bounding medium have been removed from the acoustic pressure P(a). This may be done by separating the sound field into its outgoing and incoming components. This may be performed by measuring the sound event, for example, within an anechoic environment, or by removing the reverberatory effects of the recording environment in a known manner. For example, the reverberatory effects can be removed in a known manner using techniques from spherical holography. For example, this requires the measurement of the surface pressure and velocity on two concentric spherical surfaces. This will permit a formal decomposition of the fields using spherical harmonics, and a determination of the outgoing and incoming components comprising the reverberatory field. In this event, we can replace the original source with an equivalent distribution of sources within enclosing surface $\Gamma_a$. Other methods may also be used.

By introducing a function $H_{i,j}(\omega)$, and defining it as the transfer function between source point "i" (of the equivalent source distribution) to field point "j" (on the enclosing surface $\Gamma_a$), and denoting the column vector of inputs to the sources $X_i(\omega)$, i=1, 2 . . . N, as X, the column vector of acoustic pressures $P(a)_j$ j=1, 2, . . . N, on enclosing surface $\Gamma_a$ as P, and the N×N transfer function matrix as H, then a solution for the independent inputs required for the equivalent source distribution to reproduce the acoustic pressure P(a) on enclosing surface $\Gamma_a$ may be expressed as follows $$X=H^{-1}P. \quad \text{(Eqn. 1)}$$

Given a knowledge of the acoustic pressure P(a) on the enclosing surface $\Gamma_a$, and a knowledge of the transfer function matrix (H), a solution for the inputs X may be obtained from Eqn. (1), subject to the condition that the matrix $H^{-1}$ is nonsingular.

The spatial distribution of the equivalent source distribution may be a volumetric array of sound sources, or the array may be placed on the surface of a spherical structure, for example, but is not so limited. Determining factors for the relative distribution of the source distribution in relation to the enclosing surface $\Gamma_a$ may include that they lie within enclosing surface $\Gamma_a$, that the inversion of the transfer function matrix, $H^{-1}$, is nonsingular over the entire frequency range of interest, or other factors. The behavior of this inversion is connected with the spatial situation and frequency response of the sources through the appropriate Green's Function in a straightforward manner.

The equivalent source distributions may comprise one or more of:

a) piezoceramic transducers, b) Polyvinyldine Fluoride (PVDF) actuators, c) Mylar sheets, d) vibrating panels with specific modal distributions, e) standard electroacoustic transducers, with various responses, including frequency, amplitude, and other responses, sufficient for the specific requirements (e.g., over a frequency range from about 20 Hz to about 20 kHz.

Concerning the spatial sampling criteria in the measurement of acoustic pressure P(a) on the enclosing surface $\Gamma_a$, from Nyquist sampling criteria, a minimum requirement may be that a spatial sample be taken at least one half the highest wavelength of interest. For 20 kHz in air, this requires a spatial sample to be taken every 8 mm. For a spherical enclosing $\Gamma_a$ surface of radius 2 meters, this results in approximately 683,600 sample locations over the entire surface. More or less may also be used.

Concerning the number of sources in the equivalent source distribution for the reproduction of acoustic pressure P(a), it is seen from Eqn. (1) that as many sources may be required as there are measurement locations on enclosing surface $\Gamma_a$. According to an embodiment of the invention, there may be more or less sources when compared to measurement locations. Other embodiments may also be used.

Concerning the directivity and amplitude variational capabilities of the array, it is an aspect of this invention to allow for increasing amplitude while maintaining the same spatial directivity characteristics of a lower amplitude response. This may be accomplished in the manner of solution as demonstrated in Eqn. 1, wherein now we multiply the matrix P by the desired scalar amplitude factor, while maintaining the original, relative amplitudes of acoustic pressure P(a) on enclosing surface $\Gamma_a$.

It is another aspect of this invention to vary the spatial directivity characteristics from the actual directivity pattern. This may be accomplished in a straightforward manner as in beamforming methods.

According to another aspect of the invention, the stored model of the sound field may be selectively recalled to create a sound event that is substantially the same as, or a purposely modified version of, the modeled and stored sound. As shown in FIG. 9, for example, the created sound event may be implemented by defining a predetermined geometrical surface (e.g., a spherical surface) and locating an array of loudspeakers over the geometrical surface. The loudspeakers are preferably driven by a plurality of independent inputs in a manner to cause a sound field of the created sound event to have desired parameters at an enclosing surface (for example a spherical surface) that encloses (or partially encloses) the loudspeaker array. In this way, the modeled sound field can be recreated with the same or similar parameters (e.g., amplitude and directivity pattern) over an enclosing surface. Preferably, the created sound event is produced using an explosion type sound source, i.e., the sound radiates outwardly from the plurality of loudspeakers over 360° or some portion thereof.

One advantage of the invention is that once a sound source has been modeled for a plurality of sounds and a sound library has been established, the sound reproduction equipment can be located where the sound source used to be to avoid the need for the sound source, or to duplicate the sound source, synthetically as many times as desired.

The invention takes into consideration the magnitude and direction of an original sound field over a spherical, or other surface, surrounding the original sound source. A synthetic sound source (for example, an inner spherical speaker cluster) can then reproduce the precise magnitude and direction of the original sound source at each of the individual transducer locations. The integral of all of the transducer locations (or segments) mathematically equates to a continuous function which can then determine the magnitude and direction at any point along the surface, not just the points at which the transducers are located.

According to another embodiment of the invention, the accuracy of a reconstructed sound field can be objectively determined by capturing and modeling the synthetic sound event using the same capture apparatus configuration and process as used to capture the original sound event. The synthetic sound source model can then be juxtaposed with the original sound source model to determine the precise differentials between the two models. The accuracy of the sonic reproduction can be expressed as a function of the differential measurements between the synthetic sound source model and the original sound source model. According to an embodiment of the invention, comparison of an original sound event model and a created sound event model may be performed using processor module 120.

Alternatively, the synthetic sound source can be manipulated in a variety of ways to alter the original sound field. For example, the sound projected from the synthetic sound source can be rotated with respect to the original sound field without physically moving the spherical speaker cluster. Additionally, the volume output of the synthetic source can be increased beyond the natural volume output levels of the original sound source. Additionally, the sound projected from the synthetic sound source can be narrowed or broadened by changing the algorithms of the individually powered loudspeakers within the spherical network of loudspeakers. Various other alterations or modifications of the sound source can be implemented.

By considering the original sound source to be a point source within an enclosing surface $\Gamma_a$, simple processing can be performed to model and reproduce the sound.

According to an embodiment, the sound capture occurs in an anechoic chamber or an open air environment with support structures for mounting the encompassing transducers. However, if other sound capture environments are used, known signal processing techniques can be applied to compensate for room effects. However, with larger numbers of transducers, the "compensating algorithms" can be somewhat more complex.

Once the playback system is designed based on given criteria, it can, from that point forward, be modified for various purposes, including compensation for acoustical deficiencies within the playback venue, personal preferences, macro/micro projections, and other purposes. An example of macro/micro projection is designing a synthetic sound source for various venue sizes. For example, a macro projection may be applicable when designing a synthetic sound source for an outdoor amphitheater. A micro projection may be applicable for an automobile venue. Amplitude extension is another example of macro/micro projection. This may be applicable when designing a synthetic sound source to perform 10 or 20 times the amplitude (loudness) of the original sound source. Additional purposes for modification may be narrowing or broadening the beam of projected sound (i.e., 360° reduced to 180°, etc.), altering, the volume, pitch, or tone to interact more efficiently with the other individual sound sources within the same soundfield, or other purposes.

The invention takes into consideration the "directivity characteristics" of a given sound source to be synthesized. Since different sound sources (e.g., musical instruments) have different directivity patterns the enclosing surface and/or speaker configurations for a given sound source can be tailored to that particular sound source. For example, horns are very directional and therefore require much more directivity resolution (smaller speakers spaced closer together throughout the outer surface of a portion of a sphere, or other geometric configuration), while percussion instruments are much less directional and therefore require less directivity resolution (larger speakers spaced further apart over the surface of a portion of a sphere, or other geometric configuration).

Another aspect of the invention relates to a system and method for integral transference. Integral transference includes the process of transferring a sound event from one place, space, and time, to another place, space, and time, with little or no distortion to the integral form of the original event.

Figure 11A:
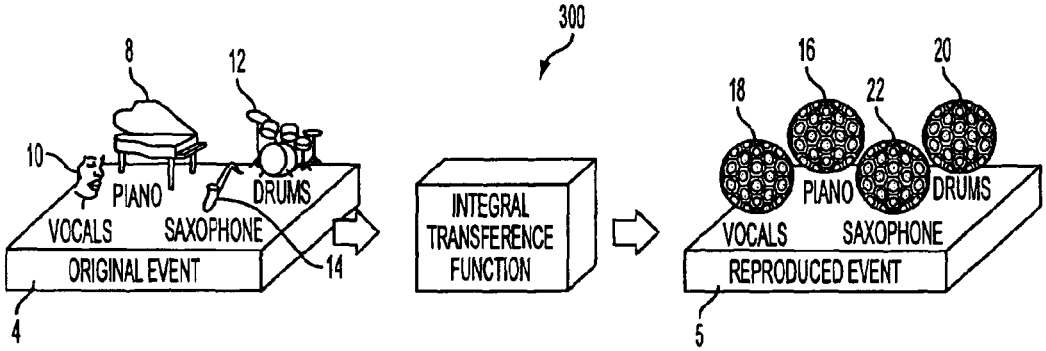
FIG. 11A illustrates an overview of integral transference according to an embodiment of the invention.

The reproduced sound event should be nearly equivalent in every detail to the original sound event. Desired modifications to the original event may be made, but the applied modifications should be specified in terms of how they deviate from the integral form of the original event. By establishing a protocol such as that provided by various aspects of the invention, the integral form of the original event becomes a reference standard by which all reproductions may be gauged and by which all modifications may be specified. Accordingly, an overview of an integral transference system 300 is shown in FIG. 11A.

The integral reality of an acoustical event may be defined as the acoustical image projected onto an imaginary (or real) surface area (e.g., sphere) circumvention the event. Near field acoustical holography has been used to model the holographic acoustical dynamics of specified sound sources, usually as part of an engineering or design study for improving the acoustical characteristics of a given sound source (e.g., engine noise). As illustrated in FIGS. 12A and 12B, the integral transference based technologies in the invention use near field acoustical holography and other 3D capture and reproduction methods and systems that can synthetically reproduce an equivalent integral reality of an original sound event.

The invention takes into consideration the magnitude and direction of an original sound field over a spherical, or other surface area, surrounding the original sound source over, preferably, a 360 degree area. A synthetic sound source (for example, an inner spherical speaker cluster) modeled after the original sound field reproduces the precise magnitude and direction of the original sound source at each of the individual transducer locations. The integral of all of the transducer locations (or segments) mathematically equates to a continuous function which then determines the magnitude and direction at any point along the surface, not just the points at which the transducers are located. Such a system reproduces a sound event in a form that a listener is not able to determine whether the event is live or recorded.

To capture an original sound source (e.g., a musical instrument), the outgoing (or propagating) field is determined over a circumscribing area, and fitted with a transducer array subject to convergence criteria on the sphere surface. If this field is fit within sufficient convergence, the field will continue to propagate within the playback environment as if the original instrument were actually playing within this volume. Some aspects of the invention create a mathematical model of the captured source which may be stored in a sound source library as discussed herein or otherwise.

Figure 13:
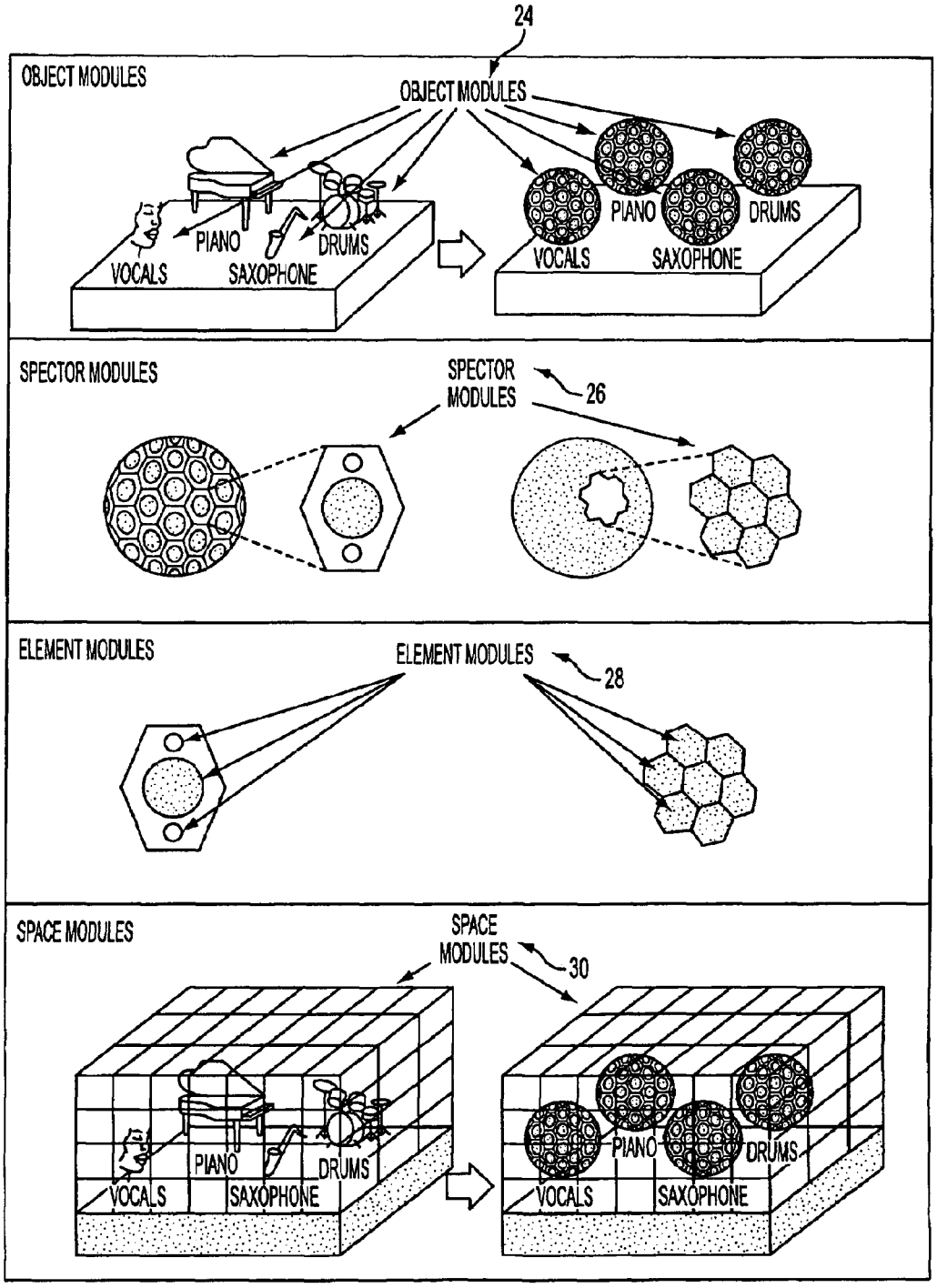
FIG. 13 illustrates an example of modulization according to an embodiment of the invention.

According to one aspect of the invention, integral transference starts with modularization, which relates to the breaking down of a sound event into its integral parts (FIG. 13). The integral parts include object modules 24 (primary and secondary sources), which can be further broken down into "sector modules" 26. Sector modules comprise the surface area of an object module. The sector modules can be further broken down into integral parts called "element modules" 28. Other levels of granularity may be used. In addition to these modular categories, a sound event may also be broken down into "space modules" 30 which determine spatial context for the other modules, such as near-field, far-field, movement algorithms, and other space-related factors (left, right, center, etc.).

Figure 14:
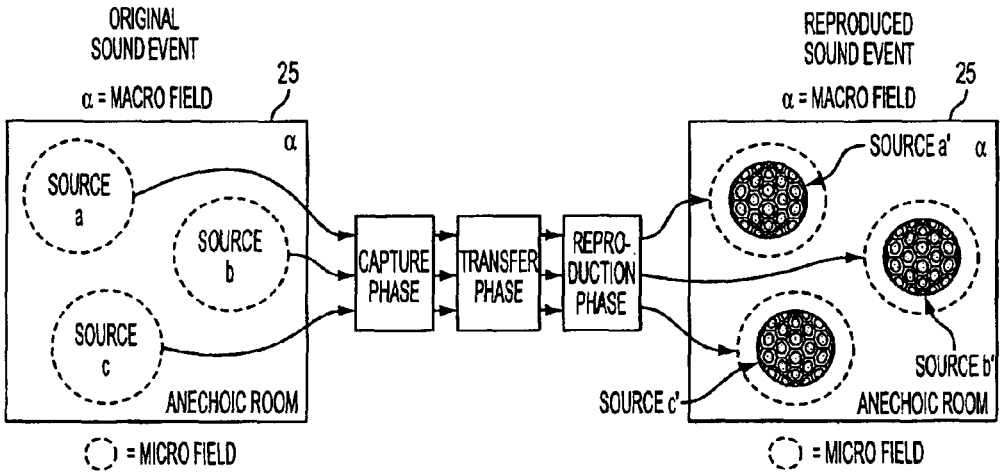
FIGS. 14-15 illustrate an overview of integral transference showing micro and macro fields of an original and reproduced sound event, according to an embodiment of the invention.
Figure 15:
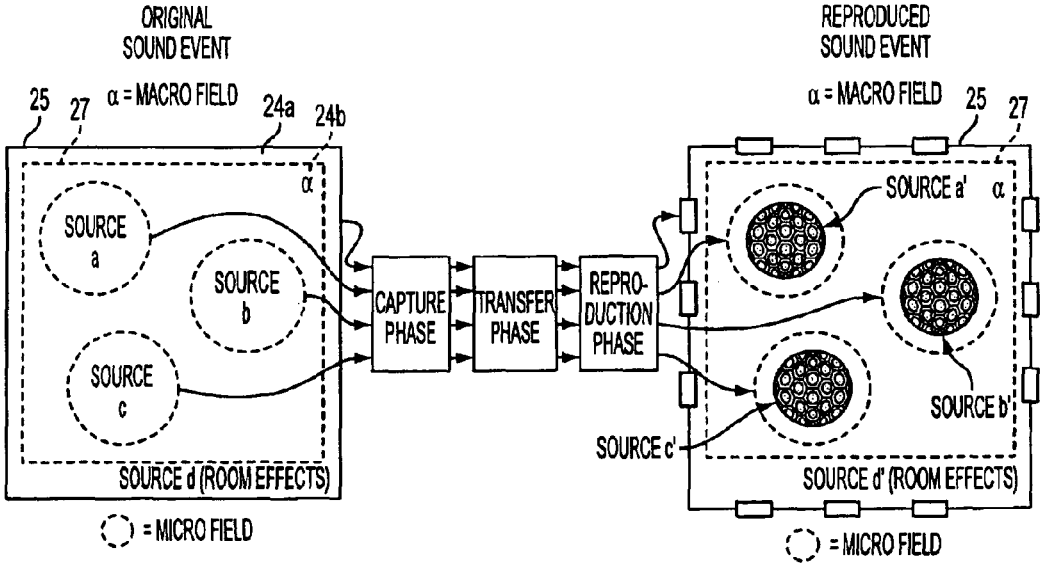
Figure 16A:
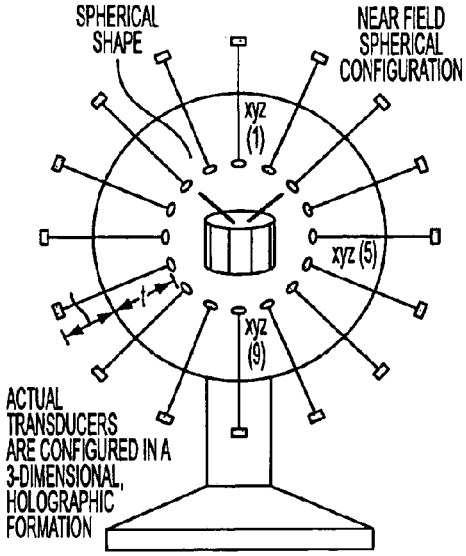
FIGS. 16A-16D illustrate near field configurations for capturing sound from a sound source according to an embodiment of the invention.
Figure 16B:
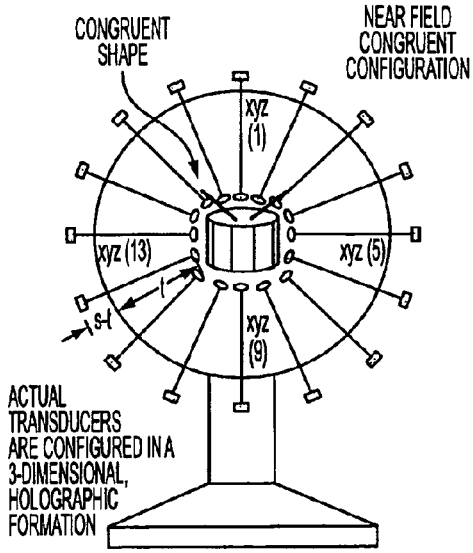
Figure 16C:
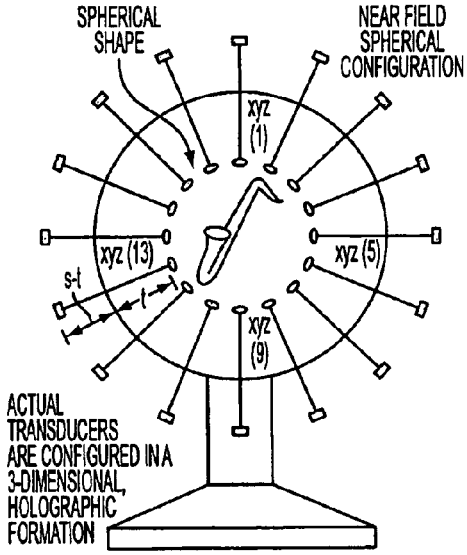
Figure 16D:
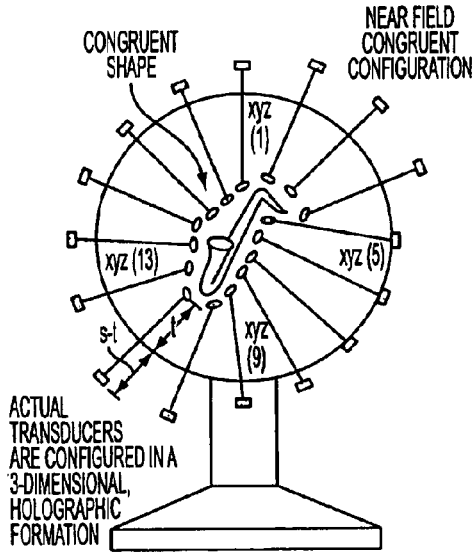

Object modules 24 relate to discrete sound producing entities (primary sources 25) and/or discrete sound affecting entities (secondary sources 27) within a given sound event. Object modules 24 are captured discretely, transferred discretely, and then reproduced discretely as synthetic objects in a reproduced event (FIG. 14, primary sources 25 only; FIG. 15, primary 25 and secondary sources 27). Ambiance is generally considered a secondary object module 24b that can be reproduced discretely or together within a source object module 24. Either way the objective is to transfer the primary source object modules 24a and the secondary source object modules 24b from an original event to its corresponding reproduced event in a manner that duplicates the discrete dynamics of the original event. By segregating object modules 24 throughout the recording and reproduction process, the rendering mechanism for each object module 24 can be customized for integral wave duplication of the original objects, or any desired derivative thereof. High-precision definition of the macro sound field may also be accomplished because of the segregated nature of the object modules 24. In addition, each object module 24 may be separately controlled and/or equalized during playback as a result of the segregated transfer of object modules 24.

In terms of capturing an object module 24, recording transducers are placed along a grid that covers the surface area of an object and each piece of the grid is a sector, as shown in FIGS. 16A-16D. The size and shape of such sectors are dependent on the engineering criteria established during the object module's design function. In terms of a standard mechanism for reproducing any sound source, a spherical grid (FIGS. 16A and 16C) is used as a reference standard for the surface area. Congruent surface areas (FIGS. 16B and 16D), which are shapes that are congruent to the shape of the source, may also be used but the spherical boundary surrounding a sound source and the integral wave form projected onto that imaginary sphere is preferable. The sound recording transducers are placed in sectors, which make up the sphere. For example, a sector may equal one element, or may be comprised of many elements, and depends generally on the desired resolution or the nature of a given sound source's integral wave. It is possible to capture the integral reality of a sound source using a single element as long as the appropriate metadata describing the integral wave properties of the specific source accompanies the single node data. The reproduction phase can extrapolate the output for all output elements based on the acoustical code for one element and the accompanying integral wave metadata.

According to another embodiment, element modules 28 are the most basic modules, consisting preferably of a single sound producing component (or power producing component) whether it be a tweeter, midrange, or mid-bass speaker, or in the power domain, an analog or digital amplifier. Element modules 28 may work together to change the dynamics of a sector module 26 which may also work together to change the dynamics of an object module 24.

Space modules 30 are somewhat different because they do not rely on the pyramid relationship associated with the element sector and object modules. Space modules 30 are a different type of modular component related to space, spatial qualities, spatial movement, relative location, and the like. For instance, if object module 24 is in the near-field close to the listener, then the space module 30 would be a near-field rendering apparatus. If object module 24 is in the far-field, then the rendering apparatus would be a far-field apparatus, considered a far-field space rendering apparatus. Other forms of space modules 30 exist when a space is divided into left, right, or surround sound directional components as is common is the discrete 5.1 (or 7.1) surround-sound format. Space modules 30 can also be used based on a spherical coordinate system for describing any point in space and the acoustical properties that exist at that point. Space modules 30 can also relate to movement algorithms that have to do with the relative position and location of object modules 24 and how they move in space relative to the listener and relative to one another.

Space modules 30 may operate independently of the object, sector, element modules (according to the modeling of the original event that is to be reproduced) and the engineering of the reproduced event based on the given resources. Space modules 30 also play an important role in the rendering of complex sound fields where primary and secondary sound sources co-exist in both the near field and far field, some moving while others may be stationary.

Figure 17:
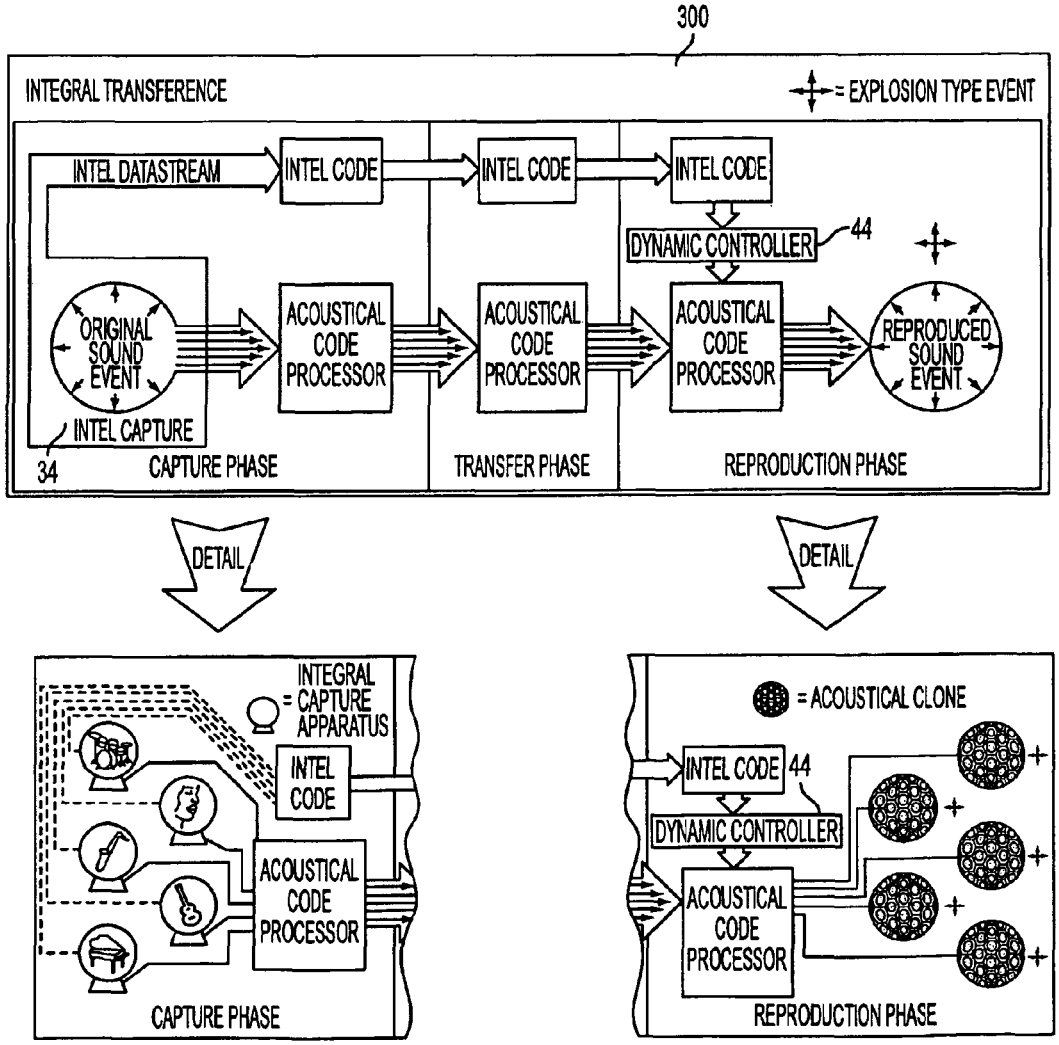
FIG. 17 illustrates an overview of integral transference using INTEL according to an embodiment of the invention.

Intelligent modules 34 are an important component of integral transference. With intelligent modules 34, the integral transference technology can be engineered to be practical and eloquent while retaining the ability to render unique integral wave fronts for each discrete sound source within a given sound event, with less data than recording a full holographic or three-dimensional sound image of a given sound event. An overview of the use of intelligent modules 34 is illustrated in FIG. 17.

The discrete transfer architecture according to the invention not only selectively segregates sound sources, it also serves as a transfer mechanism for segregated intelligent modules 34 and other forms of metadata that may apply to each segregated object module 24, as well as for control of "sector modules" 26, "element modules" 28 and "space modules" 32. Accordingly, a stored model of a sound field from an original sound source may be selectively recalled using the invention to create a sound event that is susbstantially the same as, or a purposely modified version of, the modeled and stored sound. The created sound event may be implemented by defining a predetermined geometrical surface (e.g., the spherical surface in FIGS. 16A and 16C) and locating an array of loudspeakers over the geometrical surface.

Thus, an advantage of the invention is that once a sound source has been modeled for a plurality of sounds, a sound library may be established, and the sound reproduction equipment can be located where the sound source used to be to avoid the need for the sound source, or to duplicate the sound source, synthetically as many times as desired.

According to one aspect of the invention, five primary intelligent module 34 categories are used in integral transference system 300: (1) source related intelligent module—data about a given sound source, (for example, its holographic acoustical "DNA" or fingerprint); (2) event related intelligent module—data regarding a given sound event (e.g., the spatial relationships of a plurality of sound sources in a given event); (3) system related intelligent module—data regarding a reproduction system's capabilities so it can be matched up with the content structure (e.g., number and type of rendering channels); (4) rendering appliance related intelligent module—data regarding a rendering appliance's capabilities; and (5) consumer related intelligent module—data regarding a consumer's preferences and other personal settings, adaptations, etc. More or less categories may be used.

Using intelligent modules 34, each sound source may be holographically captured and modeled resulting in an integral reality model which can then be used to synthesize a rendering appliance for projecting the same integral reality model on the same circumventing surface as the original sound source. The integral reality model is also used as a mechanism for building filters that allow spherical rendering apparatus to change dynamics based on the sound source being reproduced at the time.

Figure 18A:
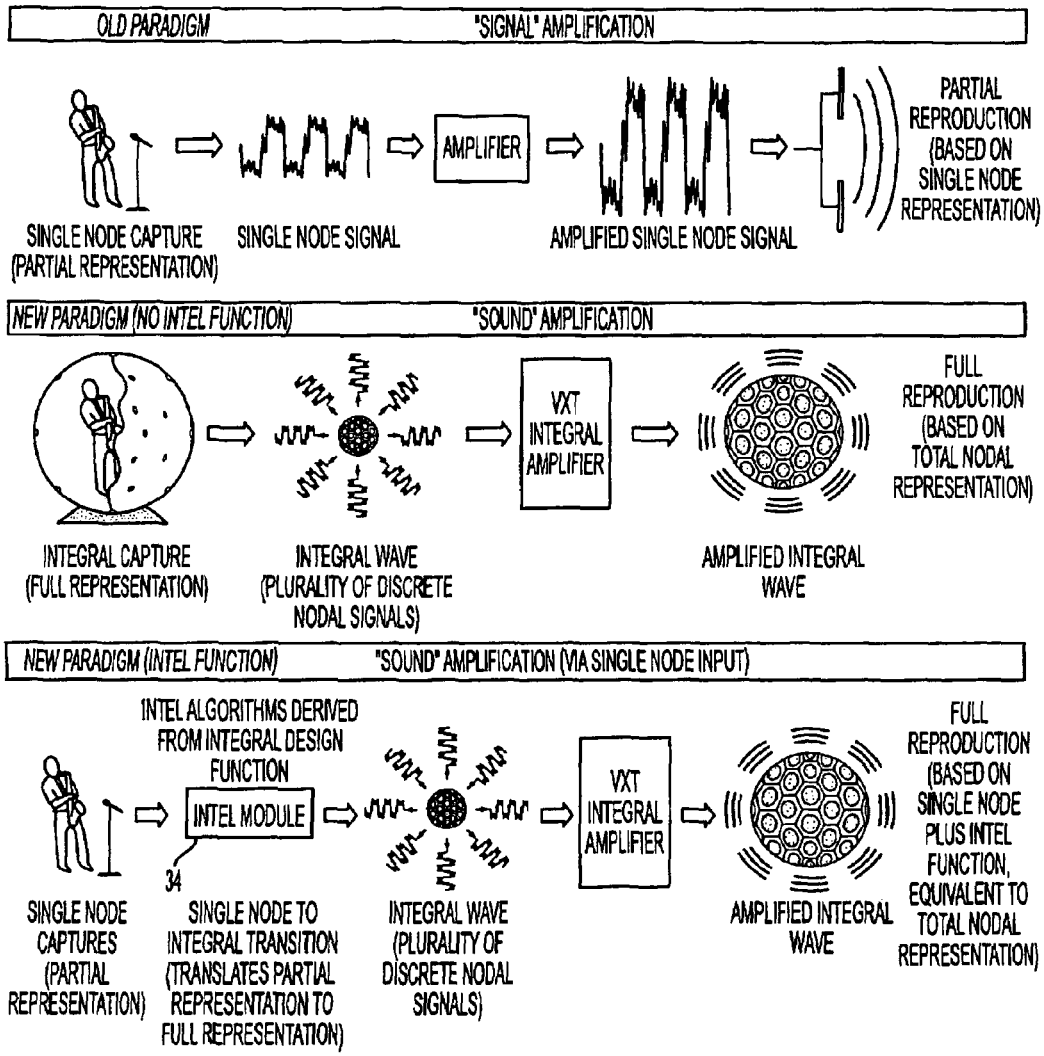
FIG. 18A illustrates an overview of the existing sound recording and reproduction paradigm and sound recording and reproduction according to integral transference with and without the INTEL function, according to an embodiment of the invention.
Figure 18B:
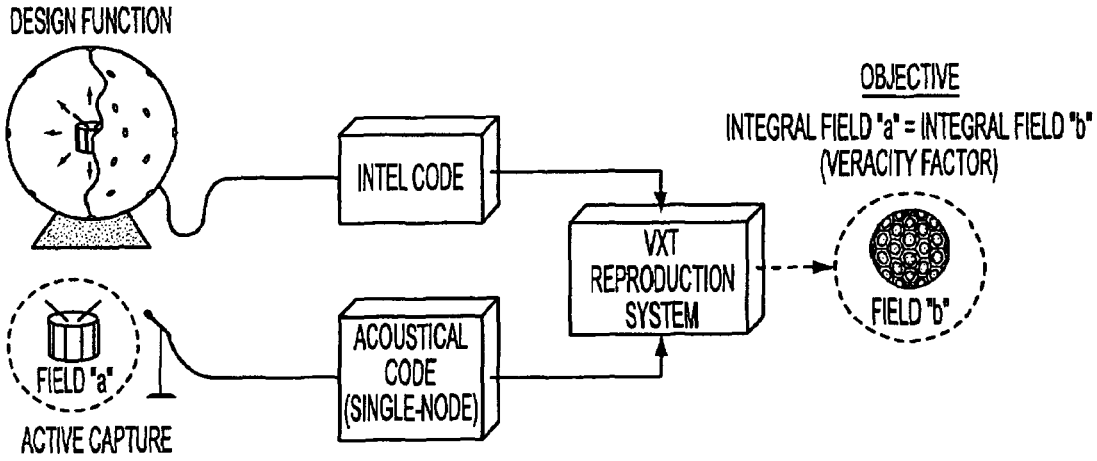
FIG. 18B illustrates an overview of the existing sound recording and reproduction paradigm and sound recording and reproduction according to integral transference with and without the INTEL function, according to an embodiment of the invention.

Source intelligent modules may be used to streamline the process of transferring and recording acoustical code from the original event through the transfer process to the reproduction system for rendering. This process, called single node capture (FIG. 18A), is dependent on source intelligent modules developed within the design function. Once comprehensive intelligent modules (integral wave equation) have been developed for a given sound source and applied to an integral wave rendering mechanism, it is then possible to capture a single input node from an original event and consequently produce all output nodes from the single input node. Thus, the invention provides for reproducing a holographic acoustical image of a sound source with one mono input.

The design function according to the invention also plays a role in the engineering and development of the recording and reproduction system. Since the number of sound sources per acoustical event changes and the system characteristics within a home or automobile or other venue usually remains the same, intelligent module functions are required in order to coordinate the number of sources, the member of available transfer channels, and the number of available reproduction channels. Preferably, each sound source retains a discrete reproduction system for reproducing the integral wave form of each original sound source and each reproduction system retains a rendering mechanism that is capable of such.

Preferably, the state spherical rendering appliance according to the invention includes intelligent modules 34 built into it, or an intelligent module 34 driving it, which allows the appliance to change its filtering dynamics in order to render virtually any type of integral wave form produced by any type of sound source. For practical reasons, however, these types of segregation in number of channels and sources and reproduction mechanism may not be feasible and therefore some form of combining integral reality models and integral reality rendering mechanism is generally considered. The intelligent module functions play a vital role in how this done efficiently and effectively.

Modularization is another element that is impacted by intelligent module functions. Because modularization covers the discrete object models for each sound event, the role of the sector modules and element modules within each object module and the spatial modules including near field and far field rendering architectures are all preferably controlled by the intelligent module function. These control schemes may be hard coded into the signal during the recording process or they can be programmed into a delta Dynamics module as part of the reproduction process. The discrete transfer architecture not only transfers discrete acoustical code in the form of object modules 24 but also transfers intelligent module code corresponding to each discrete acoustical code and other intelligent module operations that must be transferred from the recording process to the reproduction process.

Figure 19:
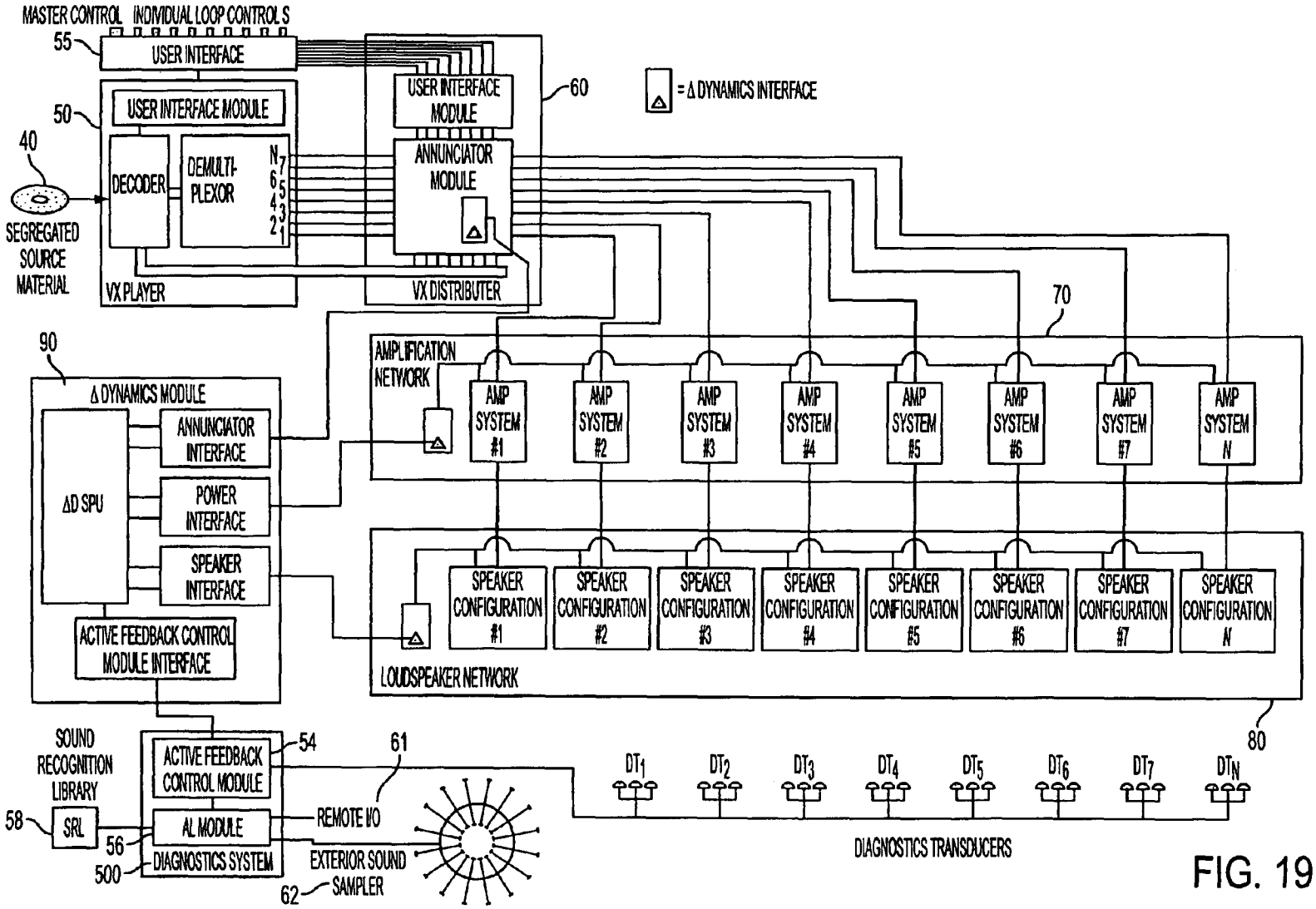
FIG. 19 illustrates a sound reproduction system according to an embodiment of the invention.

As stated earlier, when applying modularization, the original event is 32 deconstructed into object modules 24, sector modules 26, element modules 28 and space modules 32 and then transferred to a reproduction system that reconstructs these modules and reproduces the event. Each module may be controlled by the integral command and control system (FIG. 19). The intelligent module functions are capable of automatically controlling the integral transference system 300 modules, but the integral command and control system 100 provides a mechanism for manually controlling these systems and components as well.

Programmable functions also exist which include the ability to program a reproduction system to match the ideal operating parameters for a given consumer, a process called E-modeling. The specific programs are called E-gorithms.

Figure 11B:
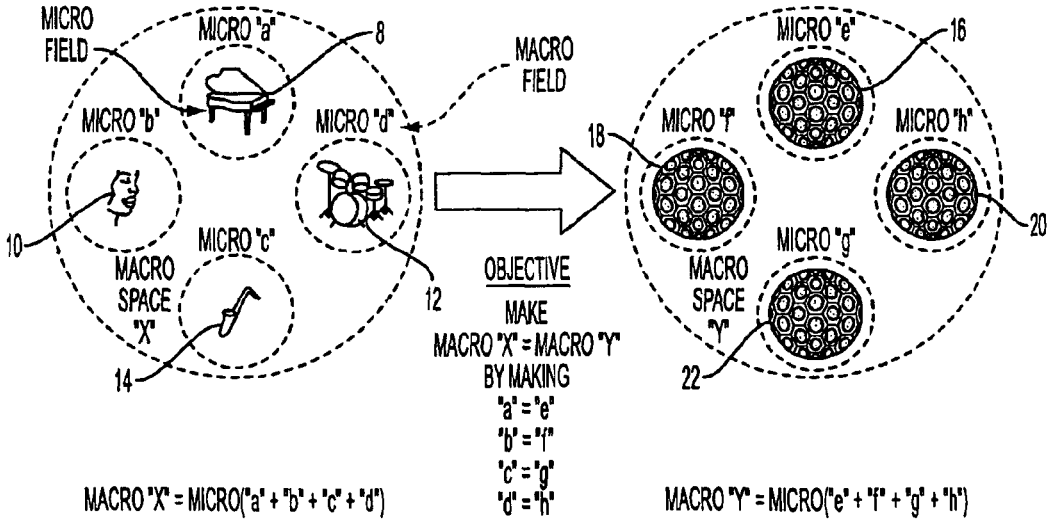
FIG. 11B illustrates an original sound event and a reproduced sound event with corresponding micro fields according to an embodiment of the invention.

Accordingly, with the invention, for example, the performance of a four piece band (three instruments, one vocal) is recorded and reproduced in its integral form including the same macro/micro dynamics as the original event (FIG. 11B).

Specifically, since the original event 4 is comprised of four discrete sound sources 8, 10, 12 and 14, each producing holographic integral wave fronts at a specific location, the reproduced event 5 is also comprised of four discrete sources 16, 18, 20 and 22 with holographic integral wave fronts at the same relative locations as those from the original event. The micro dynamics are produced by each of the discrete sources and the macro dynamics are produced by the symphony of the discrete sources and their relative spatial congruency.

Figure 20:
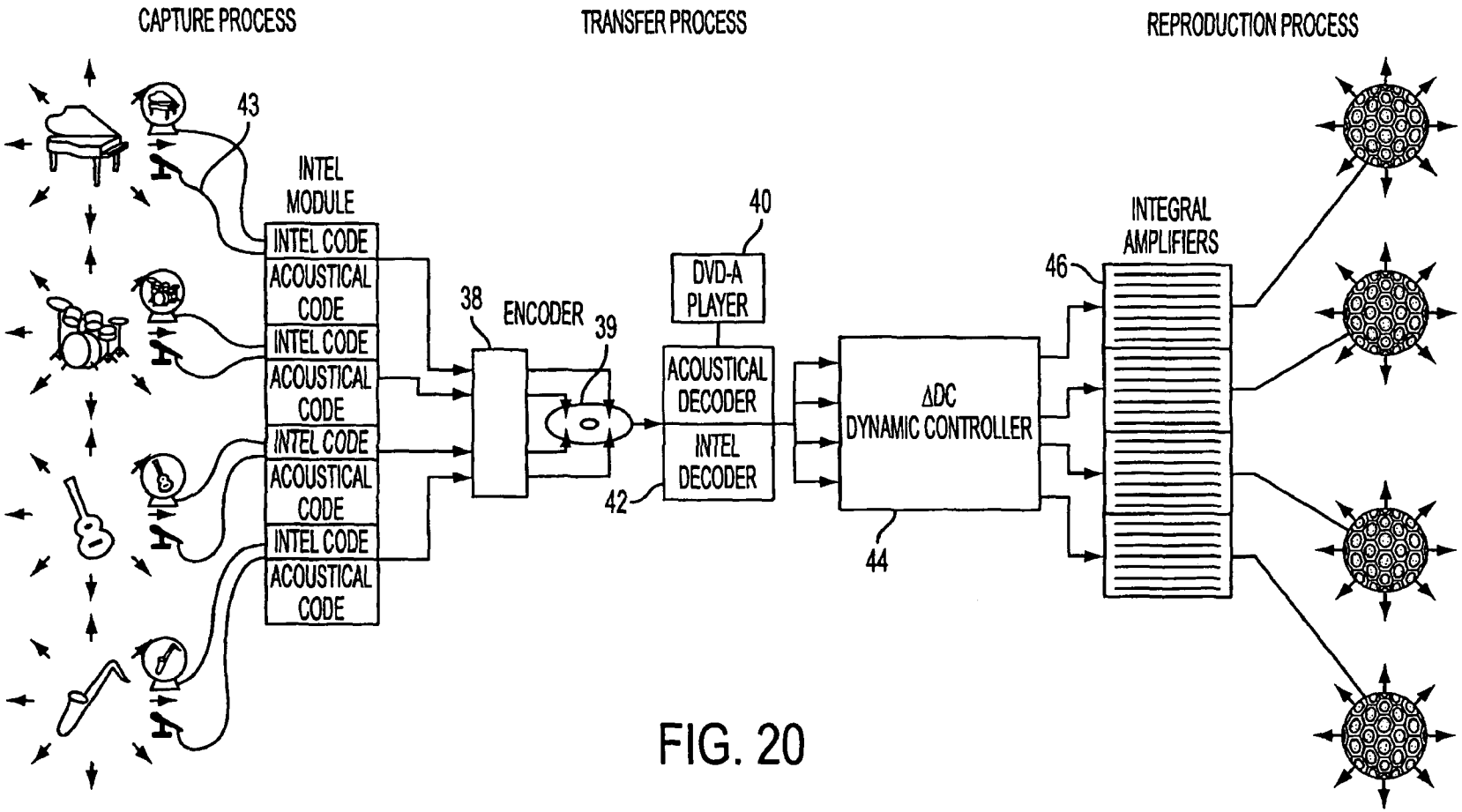
FIG. 20 illustrates an overview of a sound capture, transfer and reproduction system according to an embodiment of the invention.

FIG. 20 depicts the architecture for recording and reproducing a sound event according to integral transference, and includes a capture device which may include a microphone 43 connecting to an analog or digital recording apparatus, in this case the intelligent module 34. An intelligent module 34 includes an integral modeled sound field of the particular sound source being recorded. This modeled sound field data is combined with the data represented from the sound source and together, with the information obtained from the other sound sources, encoded preferably on to a digital recording medium such as DVD 39 through an encoder 38.

Thereafter, the DVD may be played on a DVD-A player 40 (for example) via a sound reproduction system 42 according to the invention which decodes both the intelligent module data and the sound source, feeding the decoded data into a dynamic controller 44 which controls how each of the separate sound sources is discretely amplified through amplifiers 46 and reproduced via sector module 26.

In the invention, the amplification process focuses on the amplification of the output, not the input. The output based on integral transference is a duplication of the integral wave input. In other words, if the original event consisted of three sound entities and those sound entities are captured in their integral form and transferred to the reproduction process and reproduced in their integral form, then the amplification process would be an amplified version of each integral wave, or an amplified integral wave form. This process called integral amplification may be first accomplished in the modeling domain. Once an integral reality model is captured and processed for a given sound source, the amplification of that model can take place in the modeling domain and the engineered rendering appliance can be used to create the amplified integral wave with little or no distortion.

Also important to the amplification process is the discrete nature of the transfer architecture (i.e., each sound source in the original event is captured and transferred and reproduced as a discrete entity) therefore the amplification process can be customized for that specific entity rather than using universal type components that are capable of amplifying and rendering any type of sound (usually in a planar wave form). By focusing on discrete entities for amplification, not only can the rendering appliance reproduce an amplified version of an integral wave form, but the definition between sound sources can also remain intact and the amplification curves (in terms of how each sound source is amplified relative to the other sound source and relative to the overall system elevated volume) can be customized and adjusted to match an individual persons taste.

In conjunction with integral amplification is integral scalability, both of which operate within the subheading of integral hyperization (i.e., that the integral wave of an original event is used and projecting into domains beyond its natural domain). For example, if an acoustical guitar is capable of producing an integral wave at a certain natural amplification, then if the integral wave is made ten times more elevated than normal, it would be beyond the natural ability of the guitar to produce a loudness of that magnitude. Through electronics in the invention, however, a hyper domain is created which is beyond the natural domain but retains the integral wave form.

The same concept applies towards sealability. An integral wave can be scaled down into a micro domain or it can be scaled up into it macro domain yet retaining the integral wave form of the original event. Thus, the individual sound entities may be spaced according to the original sound events spatial relationships and may be sized according to the venue designated for playback. For example, if a five piece band is recorded in a studio but played back in a automobile, then the integral transference rendering system 300 may be scaled down to match the venue size. On the other hand, if the reproduction venue is an outdoor amphitheatre, the rendering appliances may be scaled up in size and scope to meet the reproduction requirement of a large environment, all of this taking place without any distortions to the integral wave form of the original event. Deviations may also be engineered or created as desired or as mandated by resources, but preferably, the projection up and down in scale would take place with no distortions to the original wave form of the original event.

In terms of playback, in personal systems E-gorithms are specific ways of processing sound or configuring reproduction systems that appeal to specific preferences by specific people as opposed to E-models which appeal to a broader spectrum of people within certain broader type parameters. E-gorithms may be programmed into each individual system once his or her preferences are determined. For instance, someone might like the percussion to be stronger than someone else and therefore most of the sound reproduction that they experience will have an elevated percussion level. Some may desire to hear full integral wave form reproductions while others may require half-spherical reproduction mechanism. Some may require certain ambiance to be reproduced others may prefer no ambiance to be reproduced. These E-gorithms may be easily programmed or adjusted during the playback process according to each individuals criteria.

The MDF is based on the concept of modularization as discussed earlier and the fact that a sound reproduction system, according to the invention, may be gradually pieced together over time to achieve an ideal state system. Since each of the rendering appliances are modular, and since a discrete transfer architecture transfers sound sources discretely from the original event to the reproduction event, a system may be built up one source at a time and integrated with old technology as needed. For example, if someone cannot afford a seven channel discrete whole sound playback system they can first buy the percussion and bass breakout systems that would breakout the bass guitar and the drums and the bass drum and utilize special rendering appliances for those sound sources, while down-mixing the other sound sources together and playing them over a traditional stereo-type format. Over time, as resources permit, the consumer can add additional rendering appliances and change the down-mix to apply to whatever sound sources do not have special integral transference rendering appliances. Furthermore each rendering appliance may be modular as well and gradually be built up from a partial integral form to a full integral form over time.

Also, it is a feature in the invention that the sector modules 26 and element modules 28 can be replaced as needed. This allows for more inexpensive components to be used at first to make it affordable for the masses, relying on the novel configuration for the sound improvement. Over time, more expensive better quality components can be changed out as element modules 28 in the system improve in terms of minor improvement in fidelity based on the quality of the elements like loudspeakers and amplifiers.

While commercial recording applications typically take into consideration the specifications and limitations of a recording medium (e.g., the number of available channels), live sound applications are not bound by the same limitations. Yet most live sound reproduction mechanism are configured remarkably similar to a recording studio. Inputs from discrete sound producing entities are usually routed into a central mixing board where some or all of the sound signals are mixed together and then outputted to a bank of amplifiers and loudspeakers, usually stacked on two sides of a stage resulting in a left/right stereo mix, similar to the stereo mix that is encoded onto a recording medium. The problem with this can be traced back to the paradigmatic context of the paradigm in use, in this case the stereo paradigm. By mixing sound source signals together and then sharing output devices like amplifiers and loudspeakers, many of the key components for rendering precise reproductions are dismissed (e.g., precise source definition, customized integral wave form rendering, integral wave form amplification, scalability, and hyperization mechanism, to name a few).

Integral transference of the invention proposes a novel approach for engineering and building live sound reproduction mechanism. The formula is the same as it would be for recording and reproducing sound events under ideal circumstances, only without the recording medium. Integral transference concept applies because the original event (unamplified) is transferred to a larger space, even though the time and place components remain the same. The objective is to amplify and render the original event while retaining the original event's distinct unamplified qualities, like discrete source definition, integral wave rendering, integral wave amplification, integral wave scalability, integral spatial congruency of discrete sound sources, and tonal accuracy. In short, the electronically amplified version of the original event becomes an enlarged version of the unamplified event.

An electronically enhanced version of the original event may maintain the same pure, undistorted qualities of the unenhanced version, only with broader reach and higher intensity. If modifications are desired, for instance because of the acoustics of a given venue, then the modification may be described in terms of how it deviates from the ideal state integral form of the undistorted, electronically enhanced, original event. As described earlier, this provides an objective reference point for describing and evaluating modifications and other deviations from a sound event's integral form.

Another component of the integral command and control process is a diagnostic component 500 (FIG. 19). Because the reproduction system is a compilation of discrete rendering systems each rendering mechanism may be retained or maintained in its own diagnostic system which feeds into a central diagnostic processor which allows all components and all modules to be monitored and analyzed throughout the recording and reproduction process to insure that the reproduced integral models are matching up with the original integral models according to predetermined criteria.

Accordingly, if one of the segregated reproduction mechanism is malfunctioning or needing calibrating, the diagnostic system detects the problem independent of the other segregated reproduction mechanism. The diagnostic system 500 includes, for example, a plurality of diagnostic transducers (DT1-DTN), an active feedback module 54, an AI (acoustic intelligence) module 56, a sound recognition library 58, remote I/O 61, and an exterior sound sampler 62. A resolution to such problems may be segregated as well.

The diagnostics may also be used to create an objective reference standard by which reproductions can be completely and objectively compared. Accordingly, a reality reference standard is created by juxtaposing the integral reality models of the original event with the integral reality models of the reproduced event. Thus, sound events may be analyzed objectively by comparing in the proper context—their integral form. Furthermore, all modifications and derivatives in terms of how the sound deviates from the integral reality reference standard may be realized. For example, if a full spherical rendering mechanism is not required or desired then a half sphere system or quarter sphere system may be used and classified as a half integral reality system or a quarter integral reality system, respectively. Such modification protocol can be established in detail and applied to the commercialization process of integral transference systems 300.

Also related to integral standardization is the optimization protocol for optimizing components, sectors, object modules, and space modules according to predetermined criteria. Development of such reference standards and modification protocols makes it feasible for a sonic language that allows all reproductions to be described and all components to be described in terms of what role they play in the integral transference process.

FIG. 21 illustrates Convergent Wave Field Synthesis (CWFS) and Divergent Wave Field Synthesis (DWFS). Surround sound today is based on a convergent wave field synthesis architecture—the wave front is created from around the listener and converges on him from all directions to create a surround sound effect. This is ideal for reproducing environmental far-field type effects that the film industry often uses but is not ideal for reproducing near-field reproduction such as musical instruments, or dialog for that matter, which should be rendered using a divergent wave field synthesis mechanism (point source).

The integral wave form of a near-field source in the invention is projected in its holographic or three-dimensional form in all directions just as it is in the natural domain. As a source gets further from the listener it becomes a midfield or far-field source then the integral form of the wave becomes less important because based on the Huygens' Principle: as a spherical wave propagates other spherical wave fronts form upon that wave front and as the wave front propagates further from its source the shape of the wave front becomes more planar.

In the near field, the integral wave form is important, especially for musical instruments. Musical instruments are designed to appeal to the total body sensory elements (music is felt in addition to being heard). The warmth and emotion generated by a live performance or a precise reproduction forms a unique listening experience. Thus, the three-dimensional aspects of a near field rendering, especially when amplified, play a key role in elevating the natural pleasure one receives while listening to music.

Figure 22:
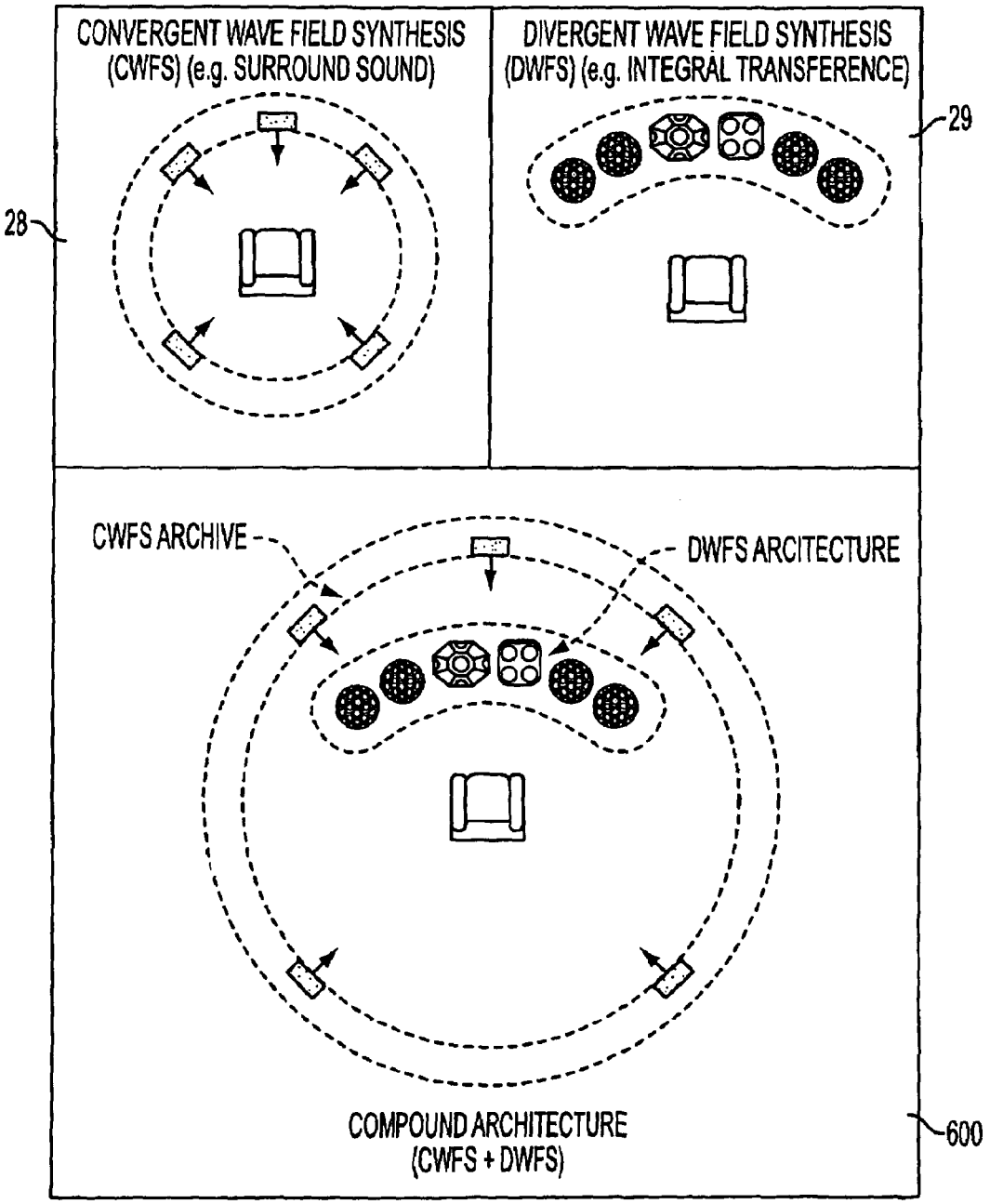
FIG. 22 illustrates a combined CWFS and DWFS system according to an embodiment of the invention.

Accordingly, one embodiment of the invention presents a compound rendering architecture 600 (shown in FIG. 22) that simultaneously renders near-field sources using divergent wave field synthesis mechanism 29 and far-field sources using convergent wave field synthesis mechanism 28. This does not mean that the compound rendering architecture is limited to two domains (i.e., near and far field), it may also be used to render multiple perspectives and multiple domains according to the engineering of the rendering system and the resources that are available and the complexity of the original event that is to be rendered.

Far field sound sources may sometimes be rendered using a near field architecture due to scaling and other special perceptual effects. However, it is difficult for a far field rendering mechanism to effectively, in its integral form, render a near field source. Thus, the present embodiment of the invention allows for near field sources to be rendered using a equipment optimized for the near field while far field sources may be rendered using equipment optimized for the far field. Moreover, other rendering perspectives can also exist. Using the integral transference protocol, multiple rendering perspectives can be engineered into a compound rendering architecture.

In cases of macro sound events where a plurality of sound sources are activated simultaneously (e.g., musical event) the integral reality of the macro event can be determined as a whole (spherical boundary circumventing the macro event) or as a compilation of multiple micro events (integral reality models for each individual sound source). The latter case is the most proficient mechanism for calculating the macro integral reality because it proposes a more modular approach and operates within the near field domain which provides better definition and resolution in terms of modeling individual integral realities. Integral transference relies on an integrated modular approach, reproducing discrete integral realities, based on the distributive principle that a macro sound event is comprised of the sum of its primary and secondary sound sources.

While the ideal state approach implies that each primary sound source (sound producing entities) and secondary sound source (sound affecting entities) should retain a discrete capture, transfer, and reproduction mechanism, the invention includes methods in which certain entities may be combined together in the modeling domain and ultimately in the rendering domain based on predetermined criteria. For instance, if a given reproduction system maintains a limited rendering mechanism, say three discrete channels, and the original sound event is comprised of six discrete sources. The discrete integral reality models of common sound sources can be combined together and rendered through a composite integral wave rendering appliance.

Accordingly, integral transference reproduction system 300 with a limited number of reproduction sources operates as follows. A controller senses the number of sound sources that are required to reproduce the sound event from the recoding medium and also senses the number of available amplification channels and number of sector modules available to reproduce the sound event. For optimum field definition and source resolution, each discrete sound source is preferably maintained with a segregated rendering mechanism. If combinations do have to occur, it is preferable that the grouping takes place among sources with common integral wave characteristics. One such solution, for example, is a standard seven channel system with each channel dedicated to one of the following musical groups: (1) strings, (2) brass, (3) horns, (4) woodwinds, (5) bass, (6) percussion, and (7) vocals. Each group may utilize a rendering mechanism customized according to the composite dynamics of all or most of the sources that fall into that group. A universal rendering mechanism for each group is then used accordingly. There are many other ways in which common sound sources can be combined together to produce composite integral waves according to the combined integral wave models of the original sources. Hybrid systems which combine integral transference appliances with more traditional type appliances (e.g., plane wave speakers) can be easily derived and utilized when necessary.

According to another embodiment of the invention, a computer usable medium having computer readable program code embodied therein for an electronic competition may be provided. For example, the computer usable medium may comprise a CD ROM, a floppy disk, a hard disk, or any other computer usable medium. One or more of the modules of system 100 may comprise computer readable program code that is provided on the computer usable medium such that when the computer usable medium is installed on a computer system, those modules cause the computer system to perform the functions described.

According to one embodiment, processor module 120, storage module 130, modification module 140, and driver module 150 may comprise computer readable code that, when installed on a computer, perform the functions described above. Also, only some of the modules may be provided in computer readable code.

According to one specific embodiment of the invention, system 300 may comprise components of a software system. System 300 may operate on a network and may be connected to other systems sharing a common database. According to an embodiment of the invention, multiple analog systems (e.g., cassette tapes) may operate in parallel to each other to accomplish the objections and functions of the invention. Other hardware arrangements may also be provided.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. The contents of all references, issued patents, and published patent applications cited throughout this application are hereby incorporated by reference. The appropriate components, processes, and methods of those patents, applications and other documents may be selected for the invention and embodiments thereof.

Other embodiments, uses and advantages of the invention will be apparent to those skilled in the art from consideration of the specification and practice of the invention disclosed herein. The specification and examples should be considered exemplary only.

What is claimed is:

1. A system for producing a holographic acoustical image of a sound event produced by a sound source*, the sound source consisting of one or more physical objects that generate sound during the sound event*, the system comprising:

at least one input node, wherein the at least one input node is configured such that a given one of the at least one input nodes is configured to individually capture parameters of the sound event with respect to a location that corresponds to the given input node;

an event related module configured to obtain information related to a position of *one or more physical objects of* the sound source during the sound event;

a source related module that [includes information related to] *stores previously obtained parameters defining* holographic acoustical dynamics of the *one or more physical objects of the* sound source*, the holographic acoustical dynamics of the one or more physical objects being independent from the sound generated during the sound event*;

a plurality of output nodes, wherein an amount of the output nodes included in the plurality of output nodes is greater than an amount of input nodes included in the at least one input node; and a processor configured to (i) apply the holographic acoustical dynamics *of the one or more physical objects* of the sound source to the parameters of the sound event captured by the at least one input node and the information related to the position of the *one or more physical objects of the* sound source obtained by the event related module of the sound event to generate the holographic acoustical image of the sound event, and (ii) to drive the plurality of output nodes to produce the generated holographic acoustical image.

2. The system of claim 1, wherein the information related to the holographic acoustical dynamics are determined via near field acoustical holography.

3. The system of claim 1, wherein the holographic acoustical image is a three-dimensional acoustic model of the original sound event.

4. The system of claim 1, further comprising a recording medium, wherein the captured at least one parameter of the sound event and the information related to the holographic acoustical dynamics of the *one or more physical objects of the* sound source me recorded independently onto the recording medium.

5. The system of claim 1, wherein the at least one input node consists of a single input node.

6. The system of claim 1, wherein the parameters of the sound event captured by the at least one input node comprise one or more of a directionality, an amplitude, or a frequency.

7. The system of claim 1, wherein the information related to the position of the *one or more physical objects of the* sound source comprises information related to one or both of a spatial position and/or an orientation of the *one or more physical objects of the* sound source.

8. The system of claim 1, further comprising a rendering appliance related module that includes information related to the capabilities of the plurality of output nodes, wherein the output nodes are driven to produce the holographic acoustical image based in part on the information related to the capabilities of the plurality of output nodes.

9. The system of claim 1, further comprising a consumer related module including information related to one or more of a consumer's preferences, personal settings, or personal adaptations, wherein the output nodes are driven to produce the holographic acoustical image based in part on the information included in the consumer related module.

10. A method of producing a holographic acoustical image of a sound event produced by a sound source, *the sound source consisting of one or more physical objects that generate sound during the sound event*, the method comprising:

capturing parameters of the sound event with at least one input node, wherein a given one of the at least one input nodes is configured to individually capture parameters of the sound event with respect to a location that corresponds to the given input node;

[obtaining information related to] *accessing previously stored parameters defining* holographic acoustical dynamics of the *one or more physical objects of the* sound source, *the holographic acoustical dynamics of the one or more physical objects being independent from the sound generated during the sound event*;

obtaining information related to a position of the *one or more physical objects of the* sound source during the sound event;

generating the holographic acoustical image of the sound event by applying the holographic acoustical dynamics of the *one or more physical objects of the* sound source to the captured parameters of the sound event and the obtained information related to the position of the *one or more physical objects of the* sound source during the sound event; and driving a plurality of output nodes to produce the holographic acoustical image of the sound event, wherein an amount of the output nodes included in the plurality of output nodes is greater than an amount of input nodes included in the at least one input node.

11. The method of claim 10, wherein the information related to the holographic acoustical dynamics are determined via near field acoustical holography.

12. The method of claim 10, wherein the holographic acoustical image is a three-dimensional acoustic model of the original sound event.

13. The method of claim 10, further comprising:

recording the captured parameters of the sound event to a recording medium; and recording the information related to the holographic acoustical dynamics to the recording medium.

14. The method of claim 10, wherein the at least one input node consists of a single input node.

15. The method of claim 10, wherein the captured parameters of the sound event comprises at least one of a directionality, an amplitude, or a frequency.

16. The method of claim 10, wherein the information related to the position of the *one or more physical objects of the* sound source during the sound event comprises one or both of a spatial position and/or an orientation of the *one or more physical objects of the* sound source.

17. The method of claim 10, further comprising obtaining information related to the capabilities of the plurality of output nodes, wherein the step of driving the output nodes comprises driving the output nodes to produce the holographic acoustical image based in part on the information related to the capabilities of the plurality of output nodes.

18. The method of claim 10, further comprising obtaining information related to one or more of a consumer's preferences, personal settings, or adaptations, wherein the step of driving the output nodes comprises driving the output nodes to produce the holographic acoustical image based in part on the information related to the consumer's preferences, personal settings, and/or adaptations.

* * * * *